(12) United States Patent
Kapusta et al.

(10) Patent No.: US 7,046,879 B2
(45) Date of Patent: May 16, 2006

(54) OPTICAL VIA FOR THREE DIMENSIONAL INTERCONNECTION

(75) Inventors: Christopher Kapusta, Duanesburg, NY (US); Min-Yi Shih, Niskayuna, NY (US); Renato Guida, Wynantskill, NY (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 10/065,881

(22) Filed: Nov. 27, 2002

(65) Prior Publication Data

US 2004/0101246 A1    May 27, 2004

(51) Int. Cl.
*G02B 6/26* (2006.01)
(52) U.S. Cl. .............................. 385/43; 385/15; 385/39
(58) Field of Classification Search .................. 385/39, 385/43
See application file for complete search history.

(56) References Cited

U.S. PATENT DOCUMENTS

| | | | |
|---|---|---|---|
| 4,413,879 A | * | 11/1983 | Berthold, III et al. ........ 385/36 |
| 4,737,004 A | | 4/1988 | Amitay et al. |
| 5,121,460 A | * | 6/1992 | Tumminelli et al. ........ 385/126 |
| 5,175,788 A | | 12/1992 | Miura et al. |
| 5,799,126 A | * | 8/1998 | Nagatani et al. ............ 385/146 |
| 6,456,766 B1 | | 9/2002 | Shaw et al. |

OTHER PUBLICATIONS

"Deformable mirrors flex low-cost potential", OLE May 2001, pp. 37-39 Evan Thrush, Ofer Levi, Ke Wang, Mark A. Wistey, James S. Harris, Jr., Stephen J. Smith; Solid State and Photonics laboratory, Stanford University, Dept. of Molecular and Cellular Physiology, Stanford University; "Integrated semiconductor fluorescent detection system for biochip and biomedical applications".

D.L. Geddis and N.M. Jorkerst, School of Electrical and Computer Engineering, Georgia Institute of Technology, Atlanta, GA; A Bi-directional Optical Link Using a Stacked Thin Emitter and Detector; CLEO 2002/Tuesday Morning; pp. 138-139.

Patent Abstracts of Japan, vol. 006, No. 096 (P-120), Jun. 4, 1982 & JP 57 030811 A (FUJITSU LTD), Feb. 19, 1982 * abstract; figures 1, 2, 4 *.

Analysis of Radiation from Tapered Multimode Slab Waveguides by the Ray-Optics Approach, Keh-Yi Lee, Shuh-Fang Liu, Way-Seen Wang, Journal of Optical Communications, Jun. 14, 1993, pp. 101-105.

International Search Report, PCT/US 03/36683, Sep. 2, 2004.

* cited by examiner

*Primary Examiner*—Jennifer Doan
(74) *Attorney, Agent, or Firm*—Cantor Colburn LLP

(57) ABSTRACT

A method and system for increasing the coupling efficiency of optical interconnections between optical elements such as optical fibers, waveguides, and vertical cavity surface emitting lasers (VCSEL) in single mode or multimode.

30 Claims, 27 Drawing Sheets (See Fig. 2)

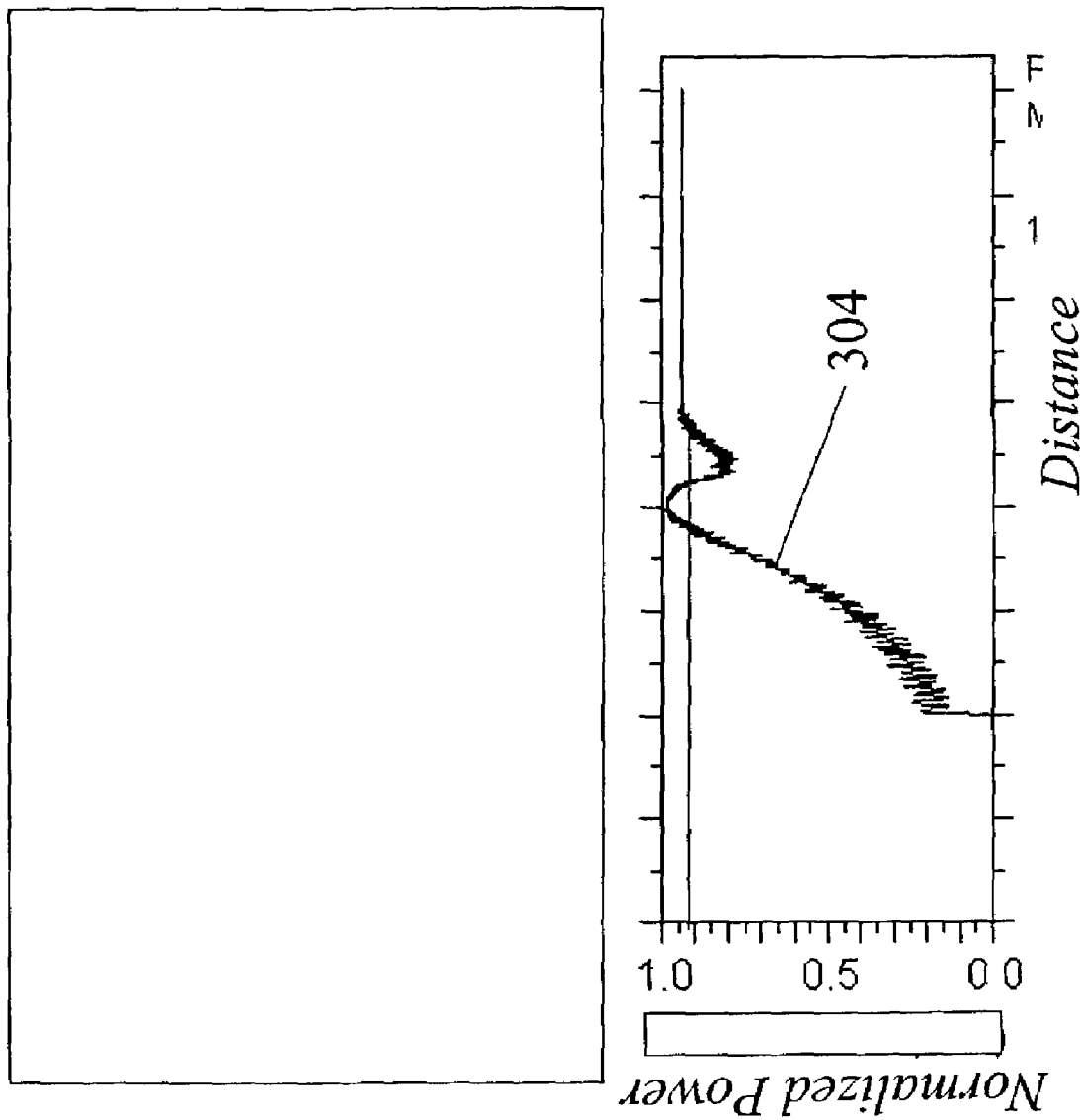

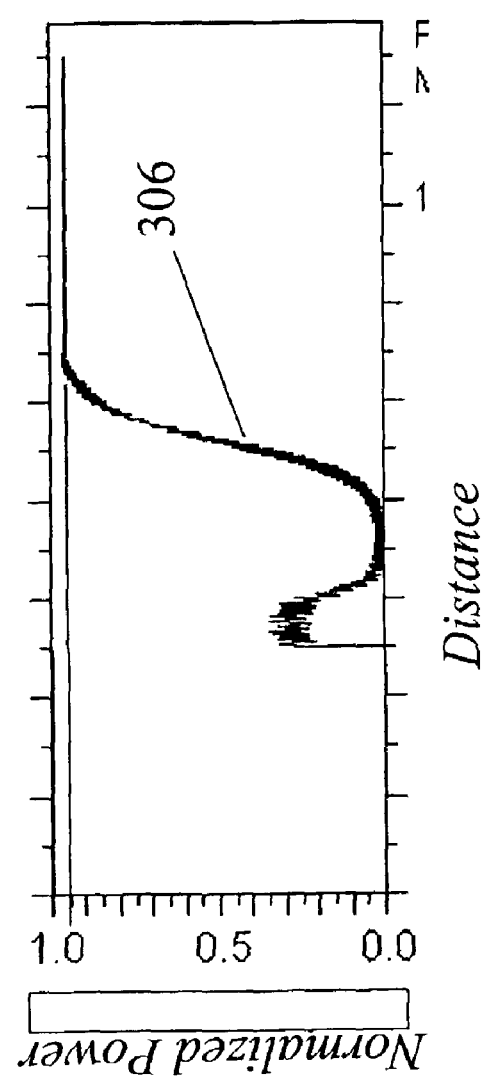

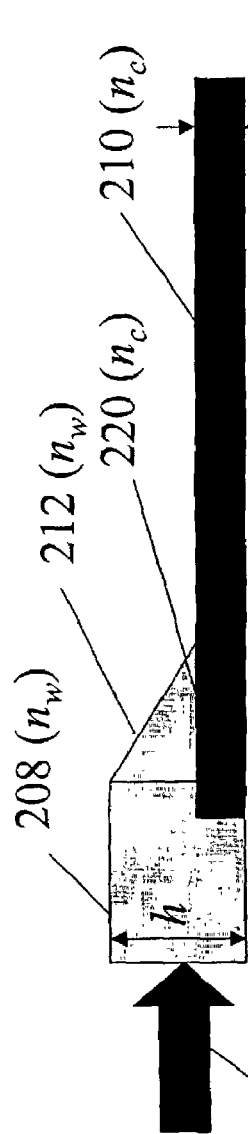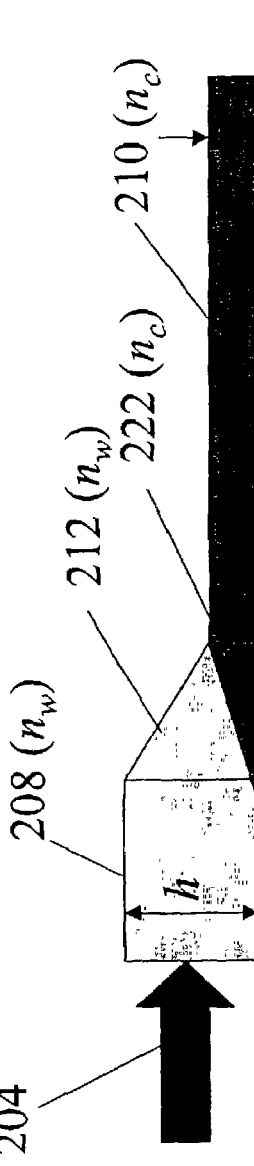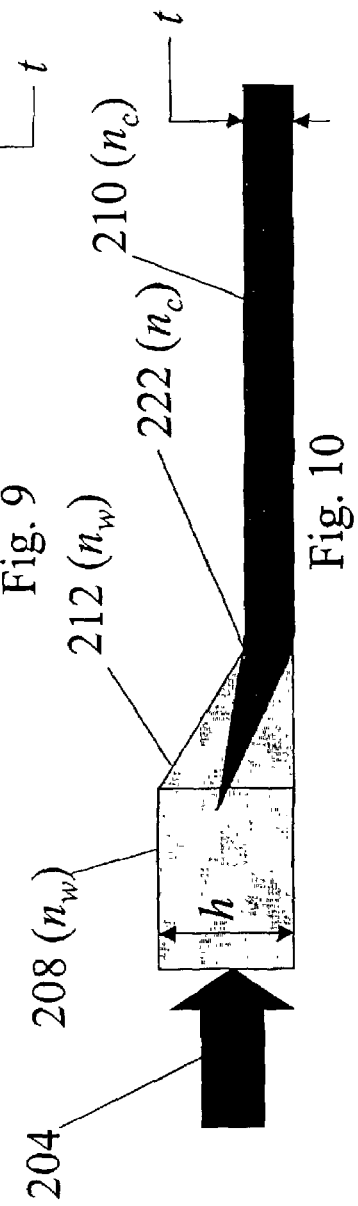

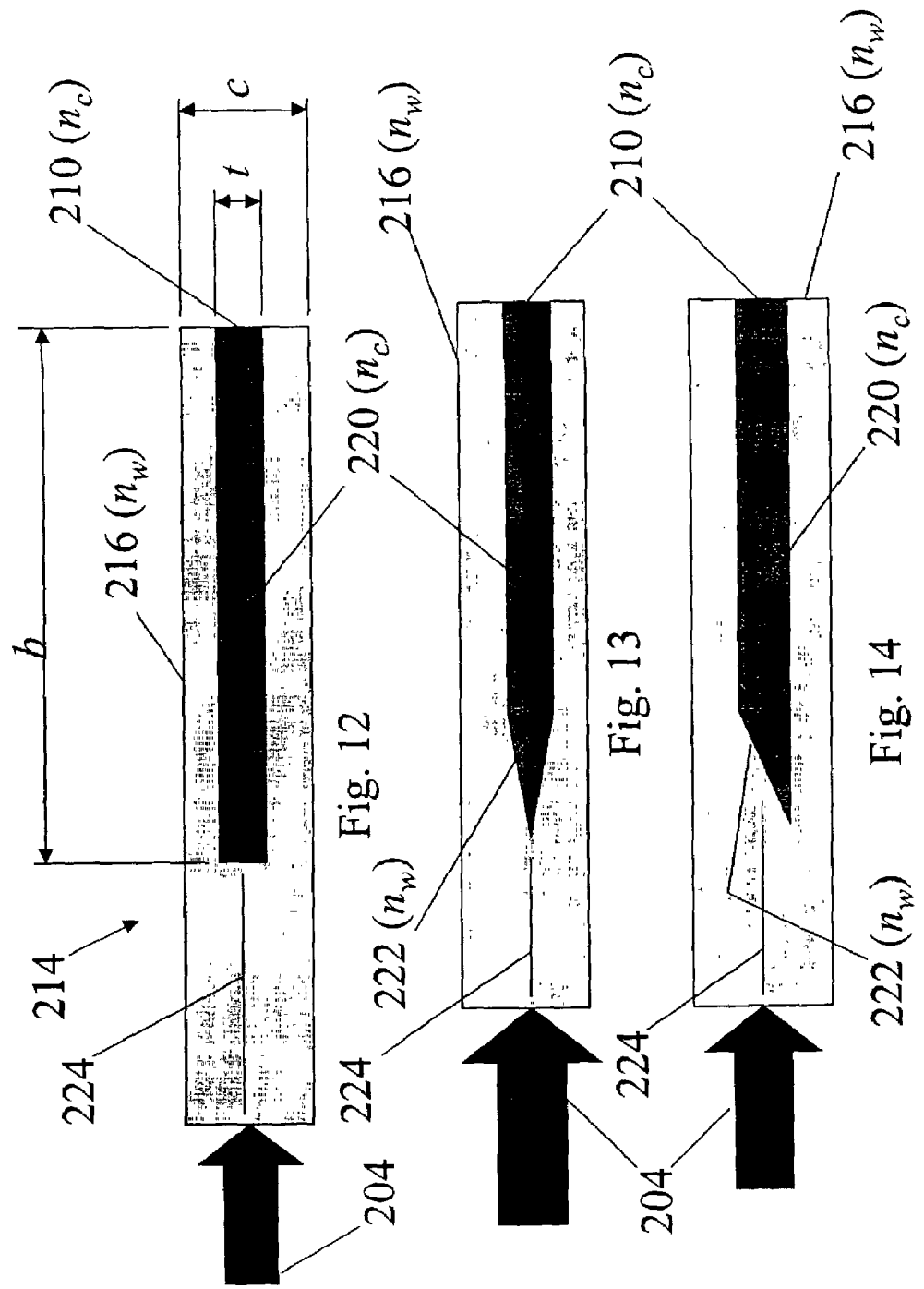

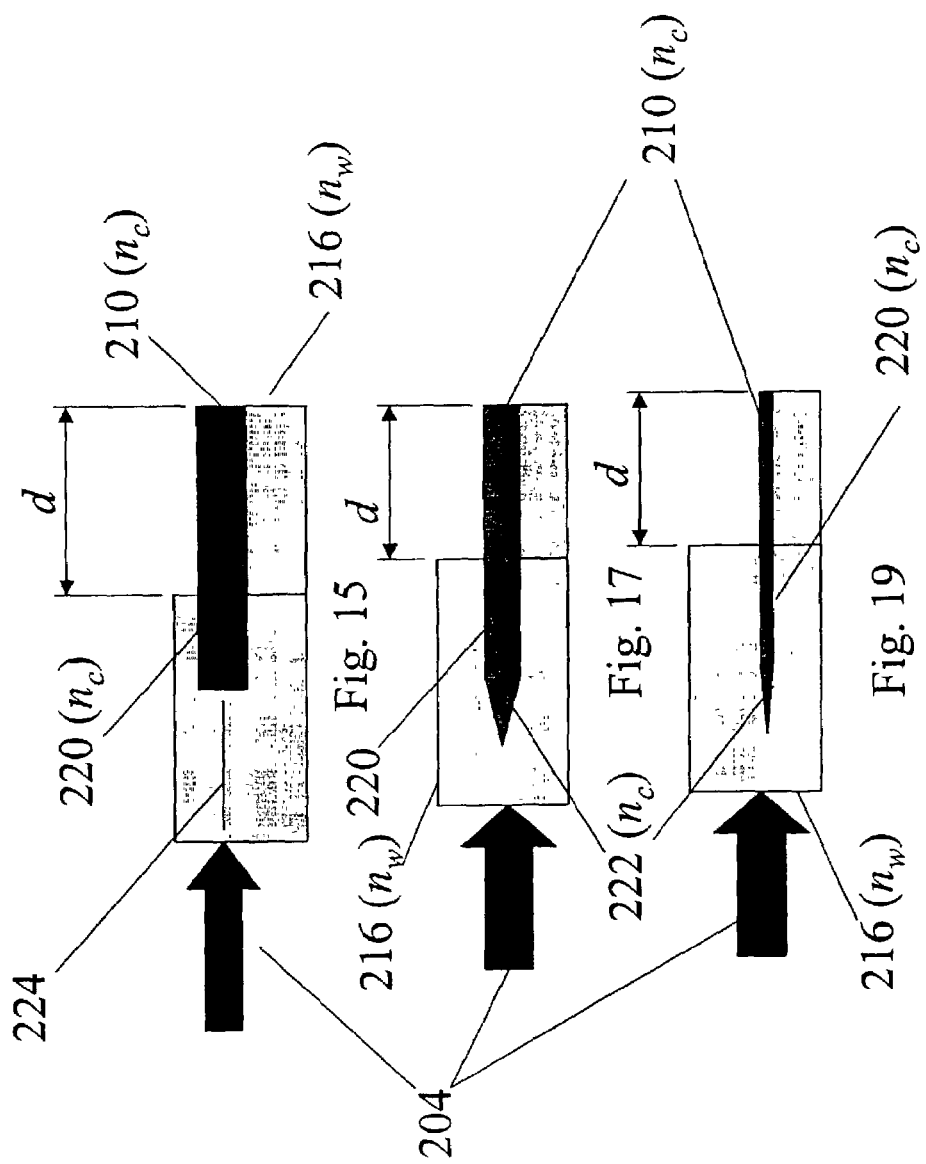

(See Fig. 17)

(See Fig. 17)

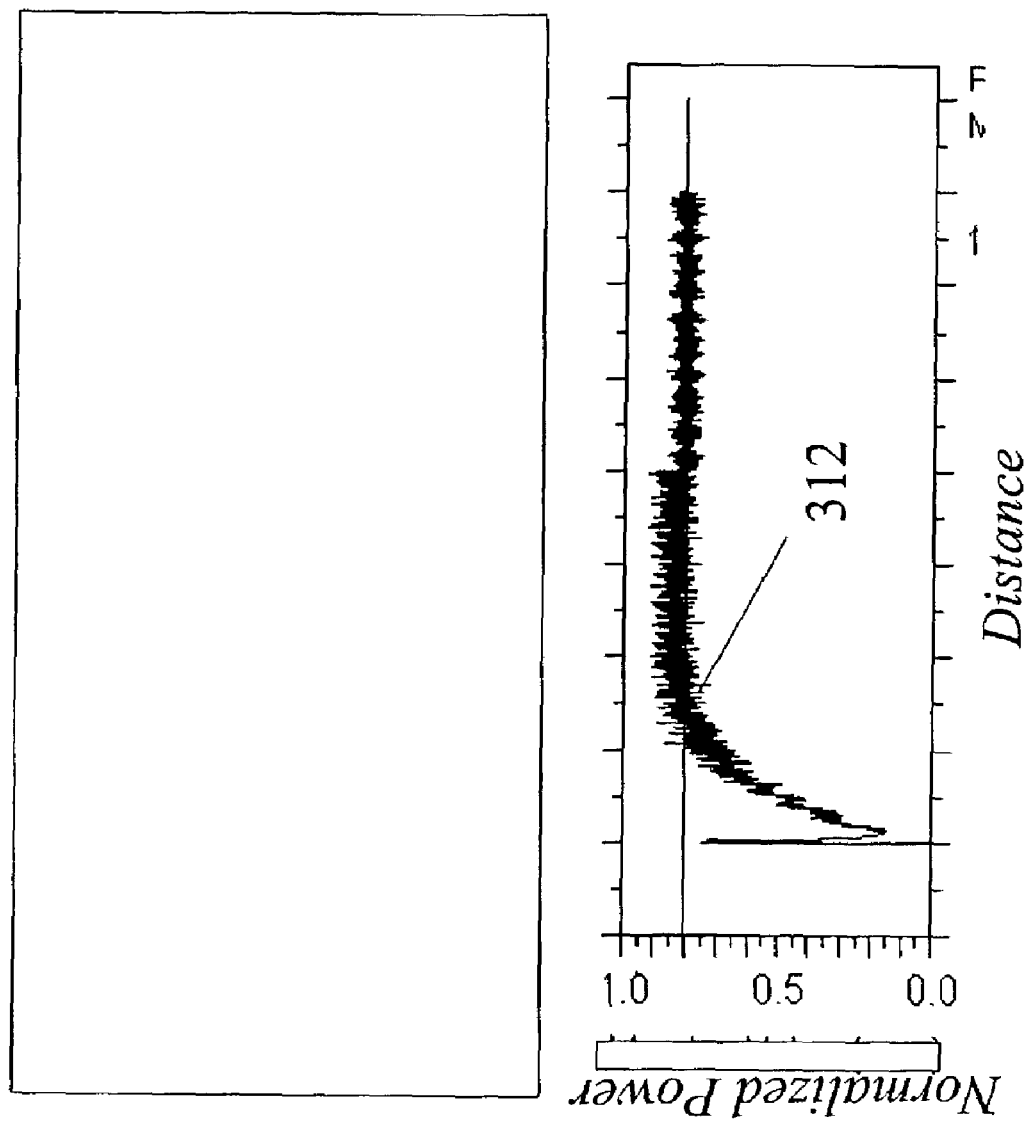

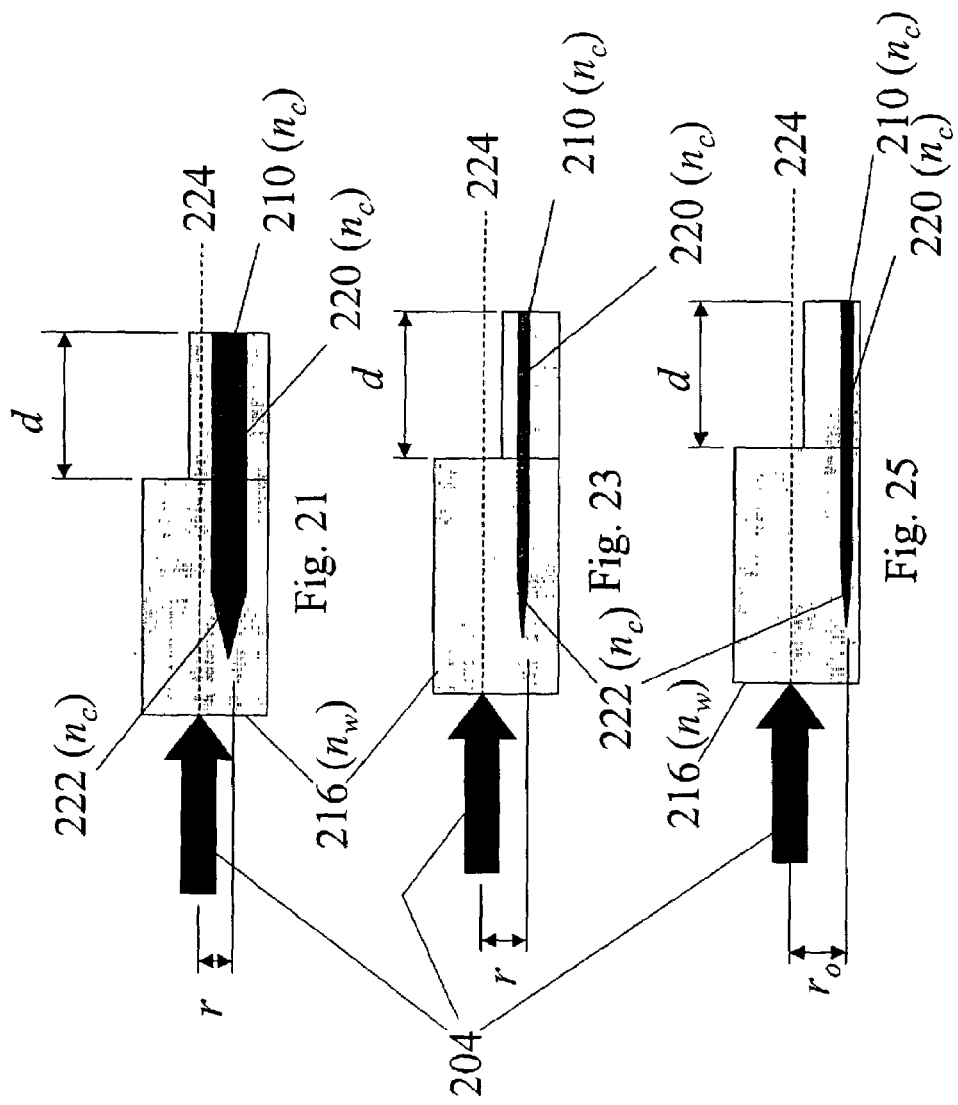

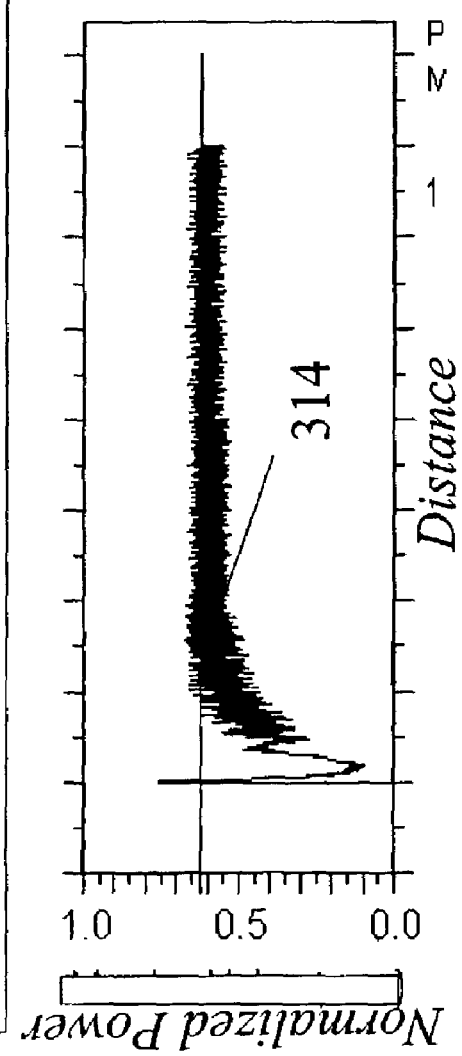
Fig 22 (See Fig. 21)

(See Fig. 23)

(See Fig. 25)

(See Fig. 17)

(See Fig. 30)

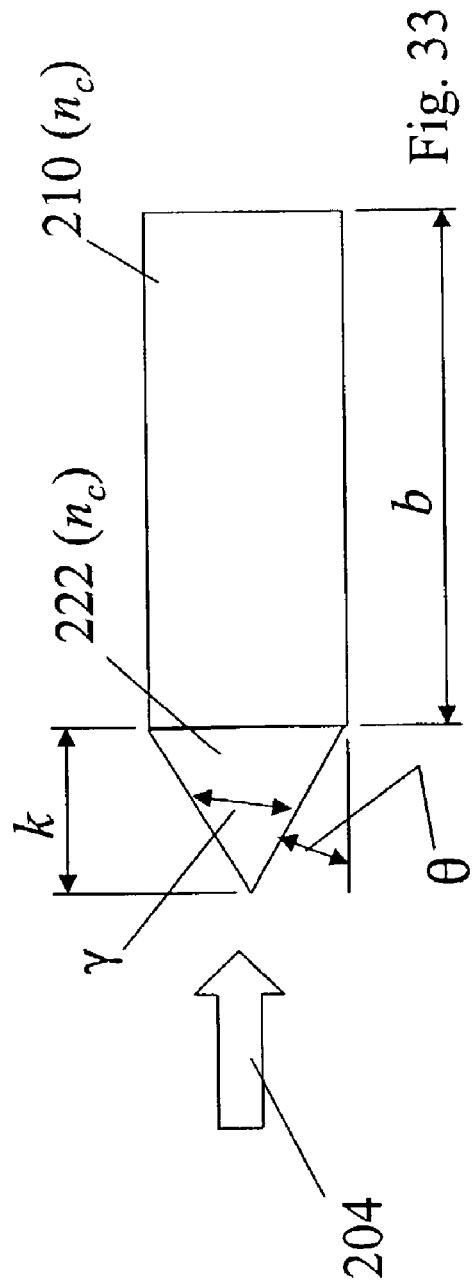
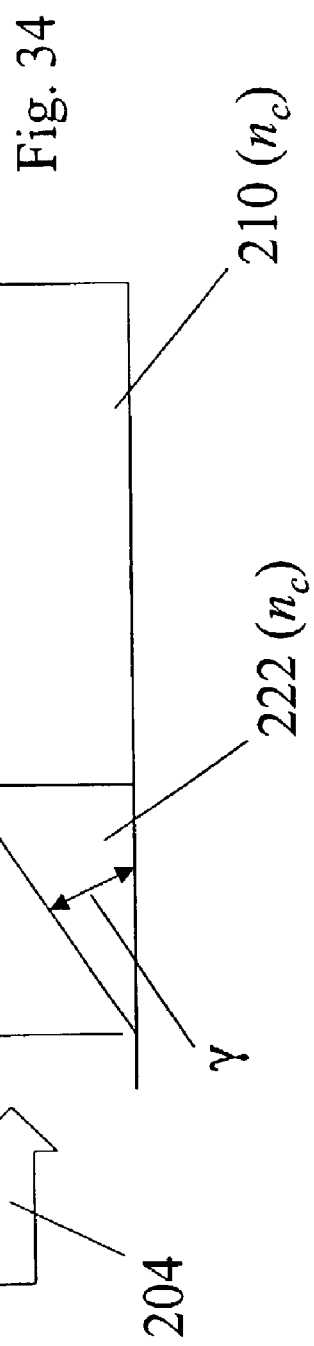

US 7,046,879 B2

OPTICAL VIA FOR THREE DIMENSIONAL INTERCONNECTION

BACKGROUND OF INVENTION

This invention relates to a system and method for the efficient coupling of radiation between optical devices and more particularly from a radiation source to a waveguide.

When coupling the output of a laser, such as a vertical cavity surface emitting (VCSEL), or a multimode optical fiber into a thin waveguide (e.g., a planar waveguide or an optical fiber), there may be large and unacceptable mode and size mismatches between the laser output mode and the modes that can be supported by the thin waveguide. These mismatches lead to correspondingly large radiation losses between the optical components. Until now these significant losses have been ignored or overcome by simply increasing the output power of the VCSEL so that a desired amount of energy is coupled into the waveguide.

In the new generation of opto-electronic components one key factor is the size thereof. On the one hand power must be limited to the minimum possible, while on the other, high power is desirable to guarantee good performances such as speed (or bandwidth) and signal/noise ratio. Thus, any power loss is at the expense of device performance. In addition, thermal and cooling issues arise at higher powers. Also, the lifetime of the VCSEL may be impaired if it is overdriven. Yet further, nonlinear or abnormal behavior such as undesired noise, distortion of output signals, etc. may result when a VCSEL has been overdriven.

Thus, there accordingly remains a need in the art for a system and method for the efficient coupling of radiation from a radiation source to a waveguide, or other optical component, without suffering excessive radiation losses at optical interconnections.

SUMMARY OF INVENTION

An optical coupling system for coupling optical energy between optical devices comprises a waveguide receptive of N-mode radiation from a radiation source where N is an integer. The waveguide comprises a first section receptive of the N-mode radiation from the radiation source and has a thickness of "h". A second section has a thickness of "t" wherein "t" is less than "h". A tapered section has a first end thereof with a corresponding thickness of "h" joined with the first waveguide section and a second end thereof with a corresponding thickness of "t" joined with the second waveguide section for coupling the N-mode radiation from the first waveguide section to the second waveguide section. Furthermore, the first section has a width of "q" and the second section a width of "w" less than "q." The first end of the tapered section has a corresponding width of "q" joined with the first waveguide section and the second end of the tapered section has a corresponding width "w" joined with the second waveguide section.

In a second embodiment, a cladding has a thickness of "c" and a refractive index of $n_w$, and is receptive of the N-mode radiation. The second waveguide section has a segment thereof positioned within the cladding and has a thickness of "t", wherein "t" is less than "c" and a refractive index of $n_c$ wherein $n_c$ is greater than $n_w$.

In a third embodiment, a waveguide has a refractive index of $n_w$ and is receptive of the N-mode radiation along an axis. The waveguide comprises a first section receptive of the N-mode radiation and a tapered section receptive of the N-mode radiation from the first waveguide section. A third section is positioned within the tapered section and has a refractive index of $n_c$ and receptive of the N-mode radiation from the tapered section; wherein $n_c$ is greater than $n_w$.

The tapered section comprises a first aperture having a first cross sectional area receptive of optical radiation and a second aperture having a second cross sectional area less than the first cross sectional area and receptive of the optical radiation from the first aperture.

BRIEF DESCRIPTION OF DRAWINGS

FIG. 6 is a graphical representation of the normalized power coupled into the waveguide of FIG. 8 as a function of distance therealong;

FIG. 7 is a graphical representation of the normalized power coupled into the waveguide of FIG. 5 as a function of distance therealong;

FIG. 8 shows an arrangement of a waveguide receptive of N-mode radiation from a radiation source wherein the waveguide includes a first section, a second section and a tapered section, the second section has a refractive index different than that of the first section and a segment of the second section is positioned within the tapered section;

FIG. 9 shows an arrangement of a waveguide receptive of N-mode radiation from a radiation source wherein the waveguide includes a first section, a second section and a tapered section, the second section has a refractive index different than that of the first section and a wedge-like segment of the second section is positioned within the tapered section;

FIG. 10 shows an arrangement of a waveguide receptive of N-mode radiation from a radiation source wherein the waveguide includes a first section, a second section and a tapered section, the second section has a refractive index different than that of the first section and a wedge-like segment of the second section is positioned within the tapered section;

FIG. 12 shows an arrangement of a waveguide receptive of N-mode radiation from a radiation source wherein the waveguide includes a first section and a second section having a refractive index different than that of the first section wherein the second section includes a segment thereof positioned within the first section;

FIG. 13 shows an arrangement of a waveguide receptive of N-mode radiation from a radiation source wherein the waveguide includes a first section and a second section having a refractive index different than that of the first section and wherein the second section includes a segment thereof positioned within the first section, the second section includes a symmetric wedge-like segment;

FIG. 14 shows an arrangement of a waveguide receptive of N-mode radiation from a radiation source wherein the waveguide includes a first section and a second section having a refractive index different than that of the first section and wherein the second section includes a segment thereof positioned within the first section, the second section includes an asymmetric wedge-like segment;

FIG. 15 shows an arrangement of a waveguide receptive of N-mode radiation from a radiation source wherein the waveguide includes a first section and a second section having a refractive index different than that of the first section and wherein the second section includes a segment thereof positioned within the first section and the first section is partially truncated;

FIG. 17 shows an arrangement of a waveguide receptive of N-mode radiation from a radiation source wherein the waveguide includes a first section and a second section having a refractive index different than that of the first section and wherein the second section includes a segment thereof including a symmetric wedge-like segment positioned within the first section and the first section is partially truncated;

FIG. 19 shows an arrangement of a waveguide receptive of N-mode radiation from a radiation source wherein the waveguide includes a first section and a second section having a refractive index different than that of the first section and wherein the second section includes a segment thereof including a symmetric wedge-like segment positioned within the first section and the first section is partially truncated;

FIG. 20 is a graphical representation of the normalized power coupled into the waveguide of FIG. 19 as a function of distance therealong;

FIG. 21 shows an arrangement of a waveguide receptive of N-mode radiation along an axis from a radiation source wherein the waveguide includes a first section and a second section having a refractive index different than that of the first section and wherein the second section includes a segment thereof including a symmetric wedge-like segment positioned within the first section, the first section is partially truncated and the second section is offset from the axis;

FIG. 22 is a graphical representation of the normalized power coupled into the waveguide of FIG. 21 as a function of distance therealong;

FIG. 23 shows an arrangement of a waveguide receptive of N-mode radiation along an axis from a radiation source wherein the waveguide includes a first section and a second section having a refractive index different than that of the first section and wherein the second section includes a segment thereof including a symmetric wedge-like segment positioned within the first section, the first section is partially truncated and the second section is offset from the axis;

FIG. 25 shows an arrangement of a waveguide receptive of N-mode radiation along an axis from a radiation source wherein the waveguide includes a first section and a second section having a refractive index different than that of the first section and wherein the second section includes a segment thereof including a symmetric wedge-like segment positioned within the first section, the first section is partially truncated and the second section is offset from the axis;

FIG. 33 is a first configuration of the symmetric wedge-like segment of the second section of the waveguide of FIG. 17;

FIG. 34 is a second configuration of the asymmetric wedge-like segment of the second section of the waveguide of FIG. 14;

DETAILED DESCRIPTION

Figure 1:
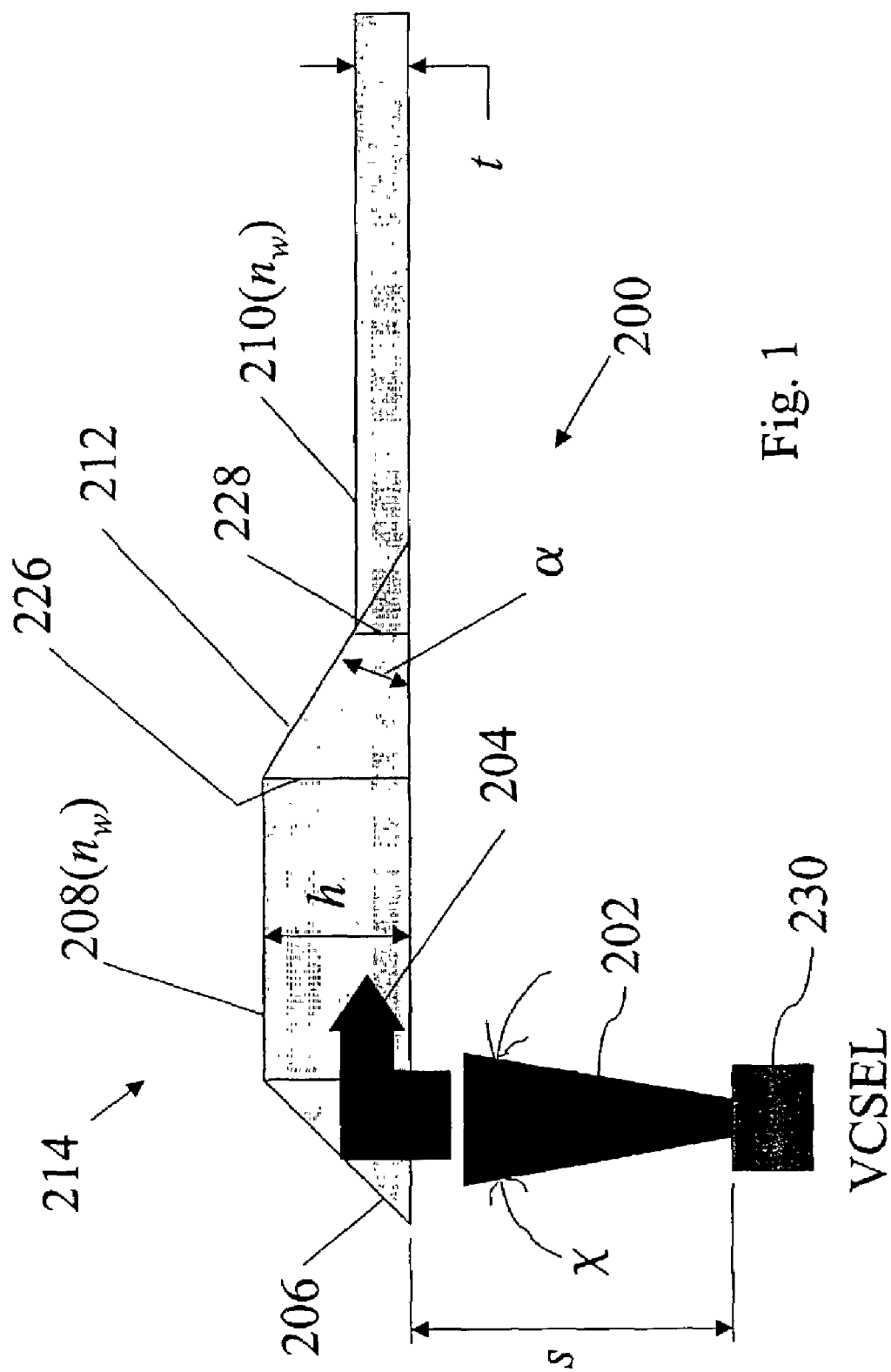
FIG. 1 shows an arrangement of a waveguide receptive of N-mode radiation from a radiation source by way of a prism wherein the waveguide includes a first section, a second section and a tapered section.
Figure 37:
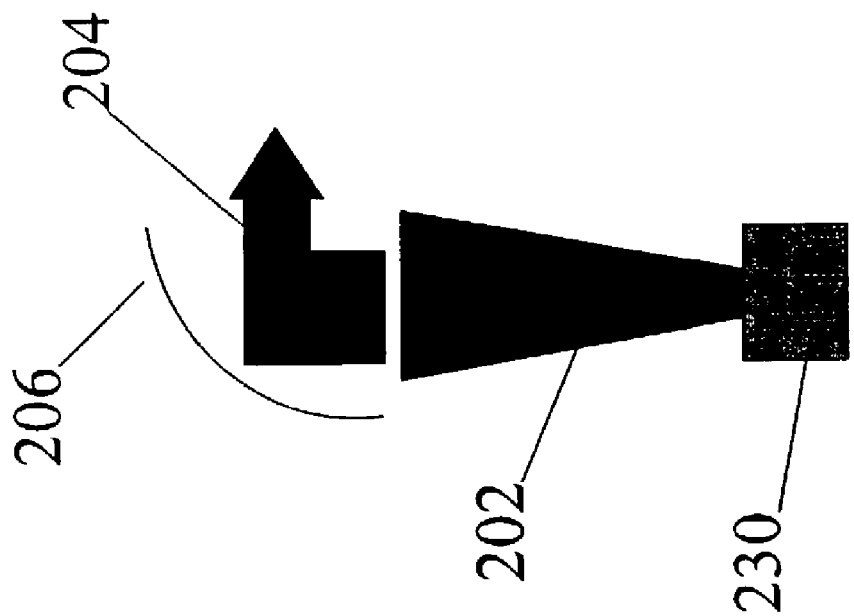
FIG. 37 shows an optical beam redirection device as a concave surface.
Figure 36:
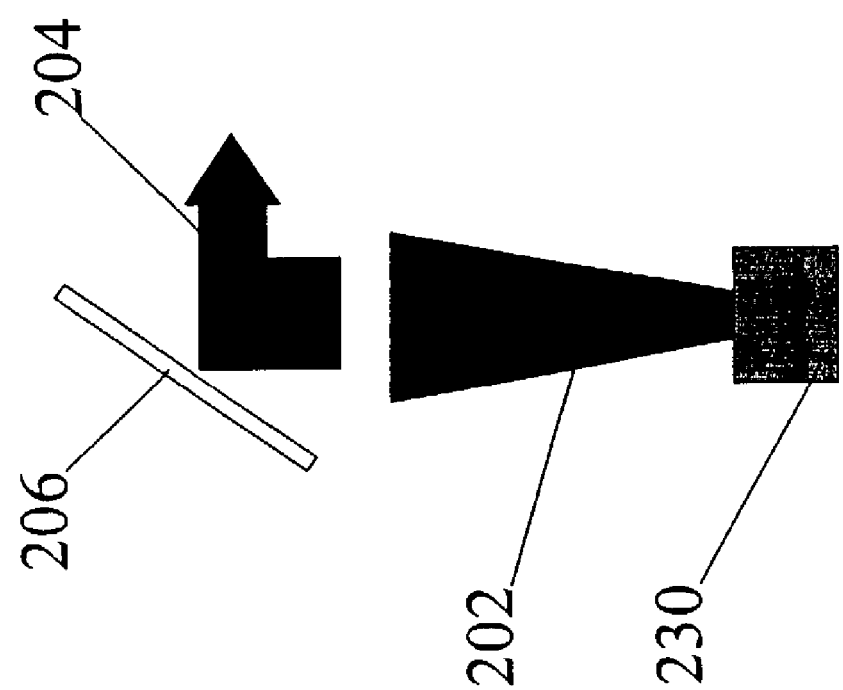
FIG. 36 shows an optical beam redirection device as a diffraction grating.

Referring to FIG. 1, a first embodiment of an optical coupling system 200 for coupling optical energy between optical devices is shown. The optical coupling system 200 comprises an optical beam redirection device 206 such as a prism (acting as a mirror by total internal reflection) or a lens. The surface of the optical beam redirection device 206 may be planar or non-planar. If, for example, the surface is concaved (FIG. 37), more light may be collected from the VCSEL and coupled into other optical components. The surface of the optical beam redirection device 206 may also be patterned or ruled like an optical diffraction grating (FIG. 36) for optical filtering or wavelength selection. All of these designs can be incorporated into the mirrored surface 206 depending upon the application, the required performance or other needs.

Figure 35:
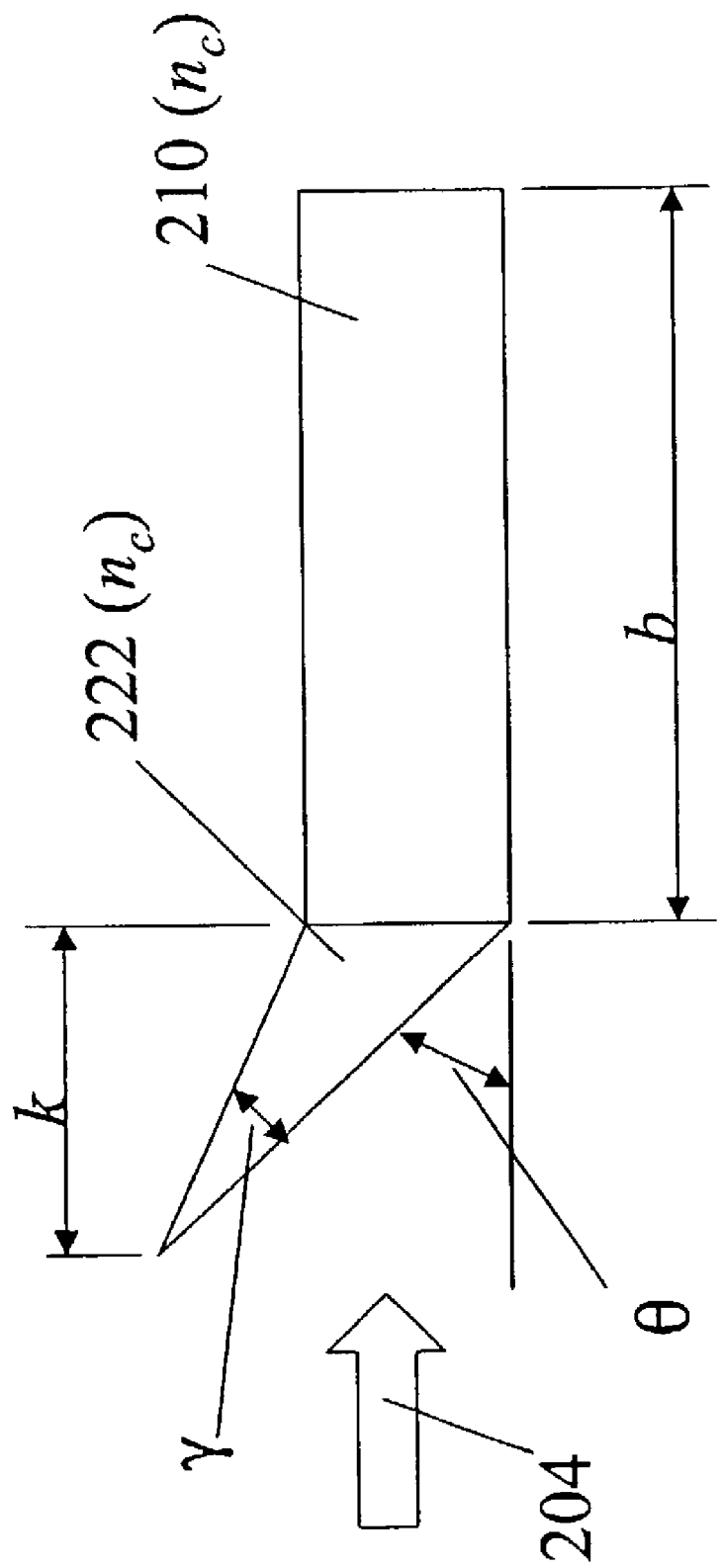
FIG. 35 is a third configuration of the asymmetric wedge-like segment of the second section of the waveguide FIG. 14.

The optical beam redirection device 206 is receptive of multi-mode radiation 202 (e.g., N-mode radiation where N is an integer) at a distance of "s" from a radiation source 230 such as a vertical cavity surface emitting laser (VCSEL), an edge emitting laser or a multimode optical fiber. The laser output 202 diverges over an approximately symmetric solid angle, X, of about 15 degrees. The optical beam redirection device 206 is placed at the distance "s" so as to capture all or substantially all of the radiation 202 emitted by the laser 230. A waveguide 214 is receptive of the N-mode radiation 204 from the optical beam redirection device 206. The waveguide 214 comprises a first section 208 having a thickness of "h", which is receptive of the N-mode radiation 204 from the optical beam redirection device 206. A second section 210 of the waveguide 214 has a thickness of "t" wherein "t" is less than "h". The dimension "h" is approximately 10–100 micrometers (um) and "t" is approximately 2–10 um. A tapered section 212 has a first aperture 226 with a thickness of h joined with the first waveguide section 208 and a second aperture 228 with a thickness of t joined with the second waveguide section 210, thus coupling the N-mode radiation 204 from the first waveguide section 208 to the second waveguide section 210. As best understood from FIG. 1, the N-mode radiation 202 may be directed directly into the first section of the waveguide 208. Also in FIG. 1, the refractive indices of the first and second waveguide sections 208, 210 and the tapered section 212 are all equal. As seen in FIG. 35, the tapered section 212 has a length, "l", of approximately 100–1000 um and also subtends a first angle, α, of about 5 degrees and a second angle, β, perpendicular to the first angle, α, of about 5 degrees measured at or near the second waveguide section 210.

Typical material compositions of the optical beam redirection device 206, the first waveguide section 208, the second waveguide section 210 and the tapered section 212 are that of special or regular glasses, semiconductors, polymers, optical sol gels, or opto-electrical crystals, etc. The waveguide and tapered structures can be fabricated by using reactive-ion etching (RIE), laser ablation, mechanical sawing, molding, stamping, gray-scale mask lithography and so on.

Figure 2:
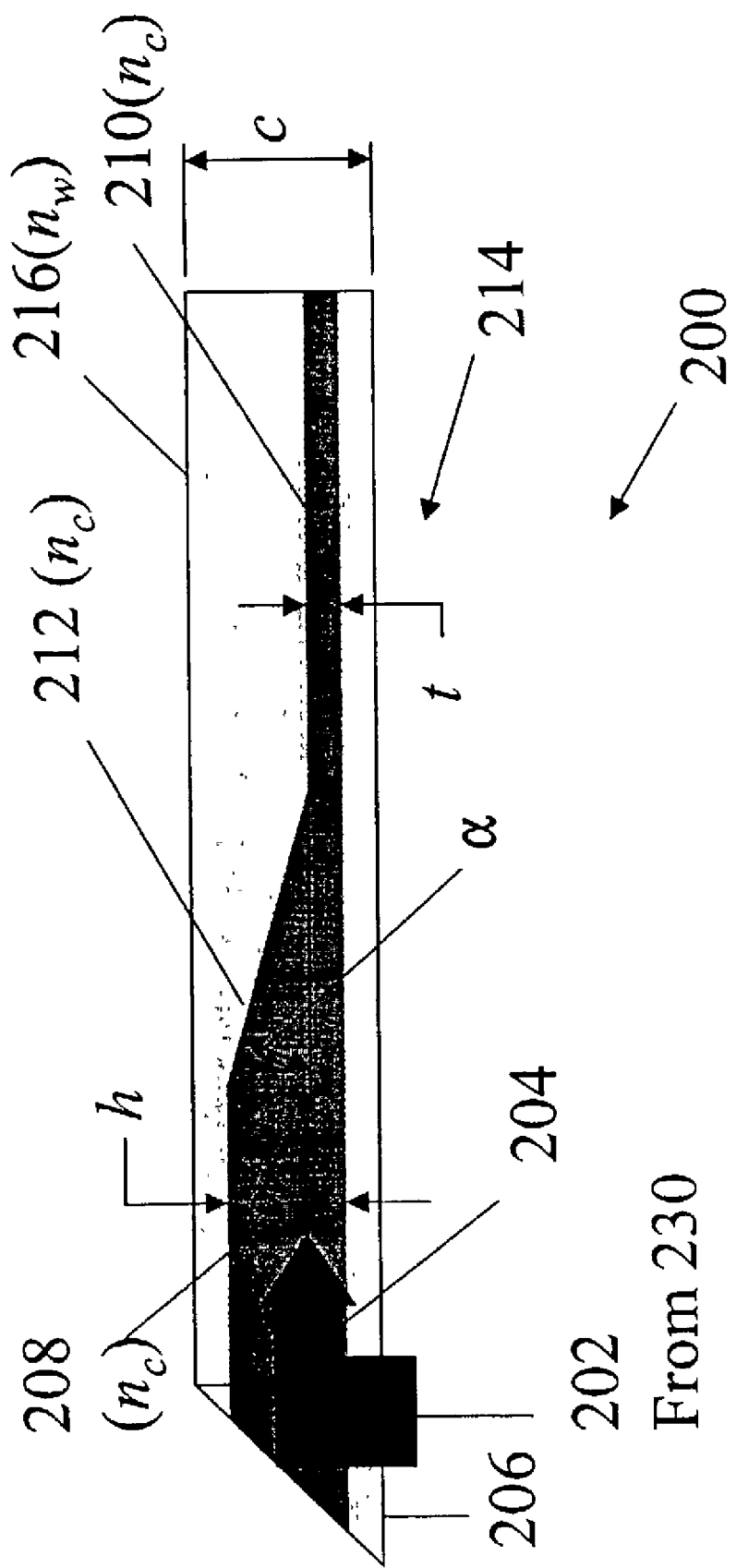
FIG. 2 shows an arrangement of a waveguide encased in a cladding and receptive of N-mode radiation from a radiation source wherein the waveguide includes a first section, a second section and a tapered section.
Figure 3:
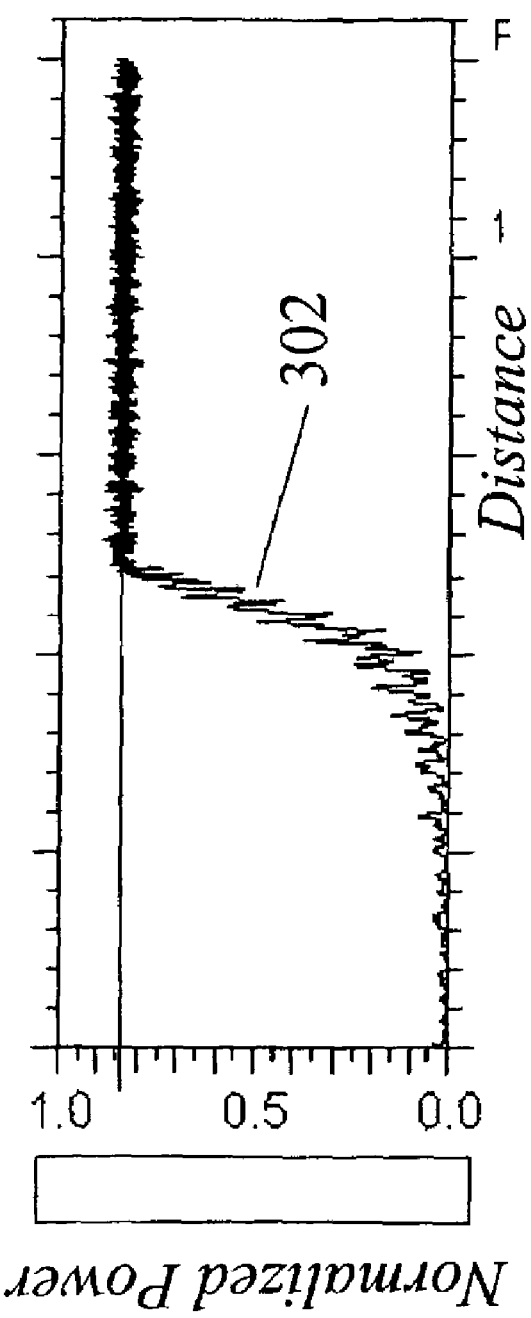
FIG. 3 is a graphical representation of the normalized power coupled into the waveguide of FIG. 2 as a function of distance therealong.

In a second embodiment of the invention, as seen in FIG. 2, the waveguide 214, which has a refractive index of $n_w$, may be encased within a cladding 216 having a refractive index of $n_c$, wherein $n_c$ is less than $n_w$. FIG. 3 depicts a graphical representation at 302 of the normalized power coupled into the second waveguide section 210 of FIG. 2 as a function of distance along the tapered section 212 and the second waveguide section 210. The maximum normalized power coupled into the second waveguide section 210 of FIG. 2 is about 0.8 normalized units.

Figure 4:
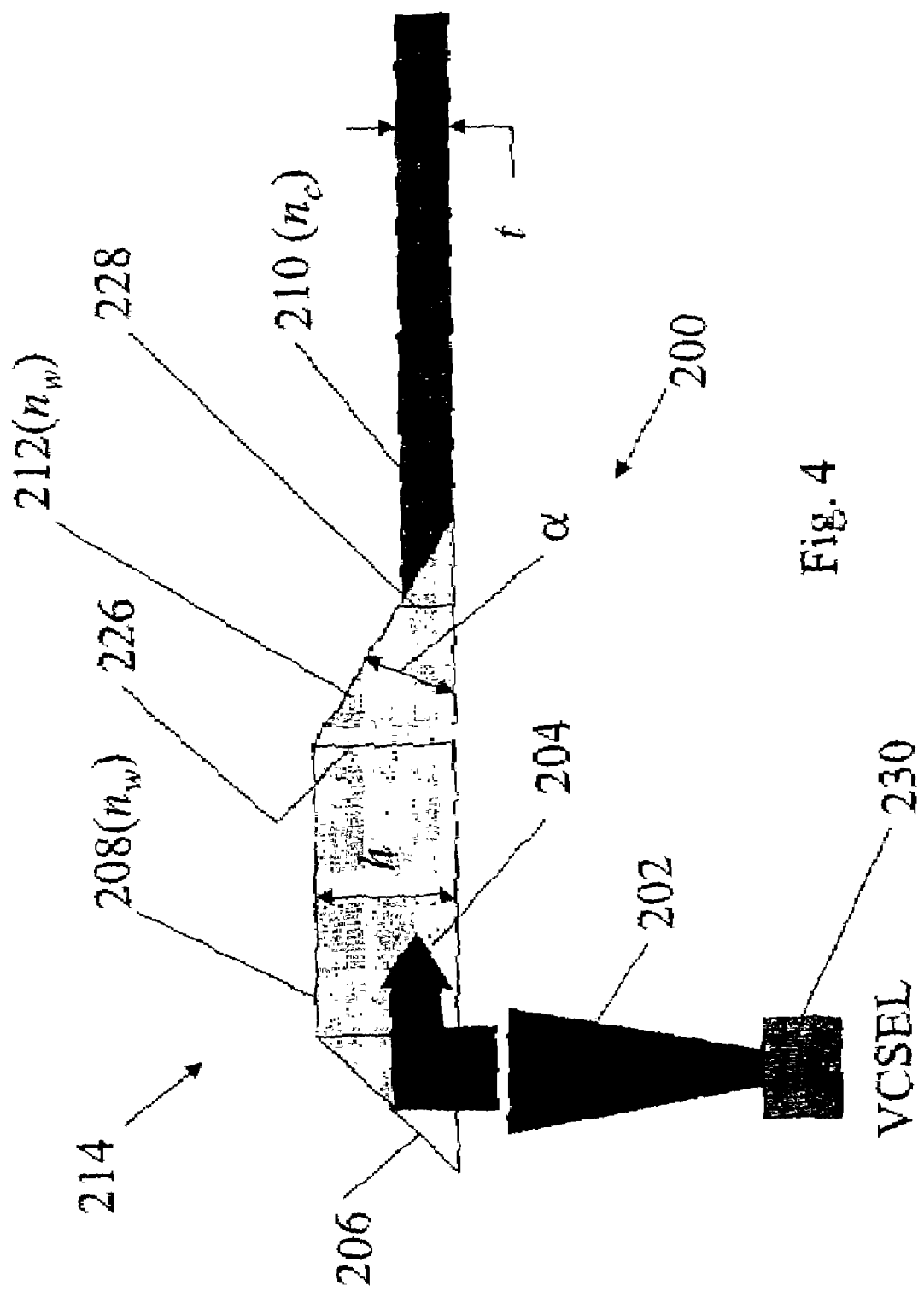
FIG. 4 shows an arrangement of a waveguide receptive of N-mode radiation from a radiation source wherein the waveguide includes a first section, a second section and a tapered section and the second section has a refractive index different than that of the first section.
Figure 5:
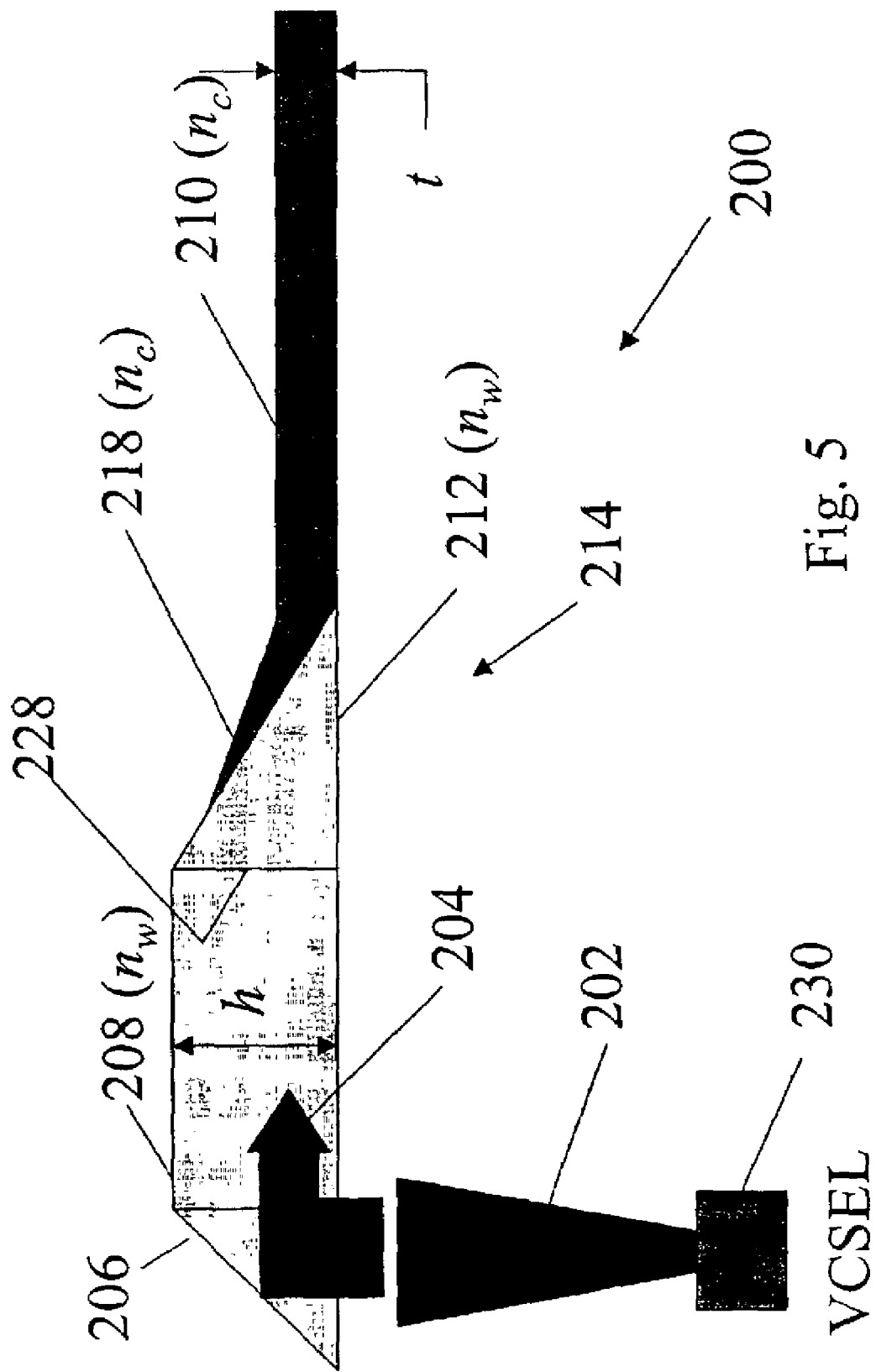
FIG. 5 shows an arrangement of a waveguide receptive of N-mode radiation from a radiation source wherein the waveguide includes a first section, a second section, a third section and a tapered section, and the second section has a refractive index different than that of the first section.

In a third embodiment, as seen in FIGS. 4 and 5, the first waveguide section 208 and the tapered section 212 are defined by the refractive index, $n_w$, and the second waveguide section 210 is defined by the refractive index, $n_c$, wherein $n_c$ is less than $n_w$. In FIG. 5, the second waveguide section 210 includes an additional, elongated top-layer taper 218 which possess the same refractive index as the second waveguide section 210 and extends from the upper surface of the second waveguide section 210 to a point along the tapered section 212, thus providing improved coupling of power between the first waveguide section 208 and the second waveguide section 210. FIG. 7 depicts a graphical representation at 306 of the normalized power coupled into the second waveguide section 210 of FIG. 5 as a function of distance along the tapered section 212 and the second waveguide section 210.

In a fourth embodiment, as seen in FIGS. 8, 9 and 10 and FIGS. 33, 34 and the second waveguide section 210 includes a segment thereof 220 positioned within the tapered section 212 or within both the tapered section 212 and the first waveguide section 208. In particular, as seen in FIG. 8, the aforesaid segment 220 comprises a rectangular shaped segment extending a length, "w", into the tapered section 212 and the first waveguide section 212. FIG. 6 depicts a graphical representation at 304 of the normalized power coupled into the second waveguide section 210 of FIG. 8 as a function of distance along the tapered section 212 and the second waveguide section 210. In FIG. 9, the aforesaid segment 220 comprises a wedge 222 having a generally triangular cross section including a base with a thickness of t joined with the second waveguide section 210. The triangular cross section in FIG. 9 also includes an angled apex 5–10 degrees in opposition to the base subtending an angle, γ, of approximately 5–10 degrees. The triangular cross section in FIG. 9 is generally a right triangle positioned so that the hypotenuse thereof is first receptive of the N-mode radiation 204 from the tapered section 212, thus coupling the N-mode radiation from the first waveguide section 208 to the second waveguide section 210. In FIG. 10, the triangular cross section 220 is inclined with respect to the second waveguide section 210 at angle, θ, of between approximately 5–10 degrees. As best understood from FIGS. 8, 9 and 10, the first waveguide section 208 acts as a waveguide (e.g.; as a core material), while the cladding thereto is a substrate below and air above.

Figure 11:
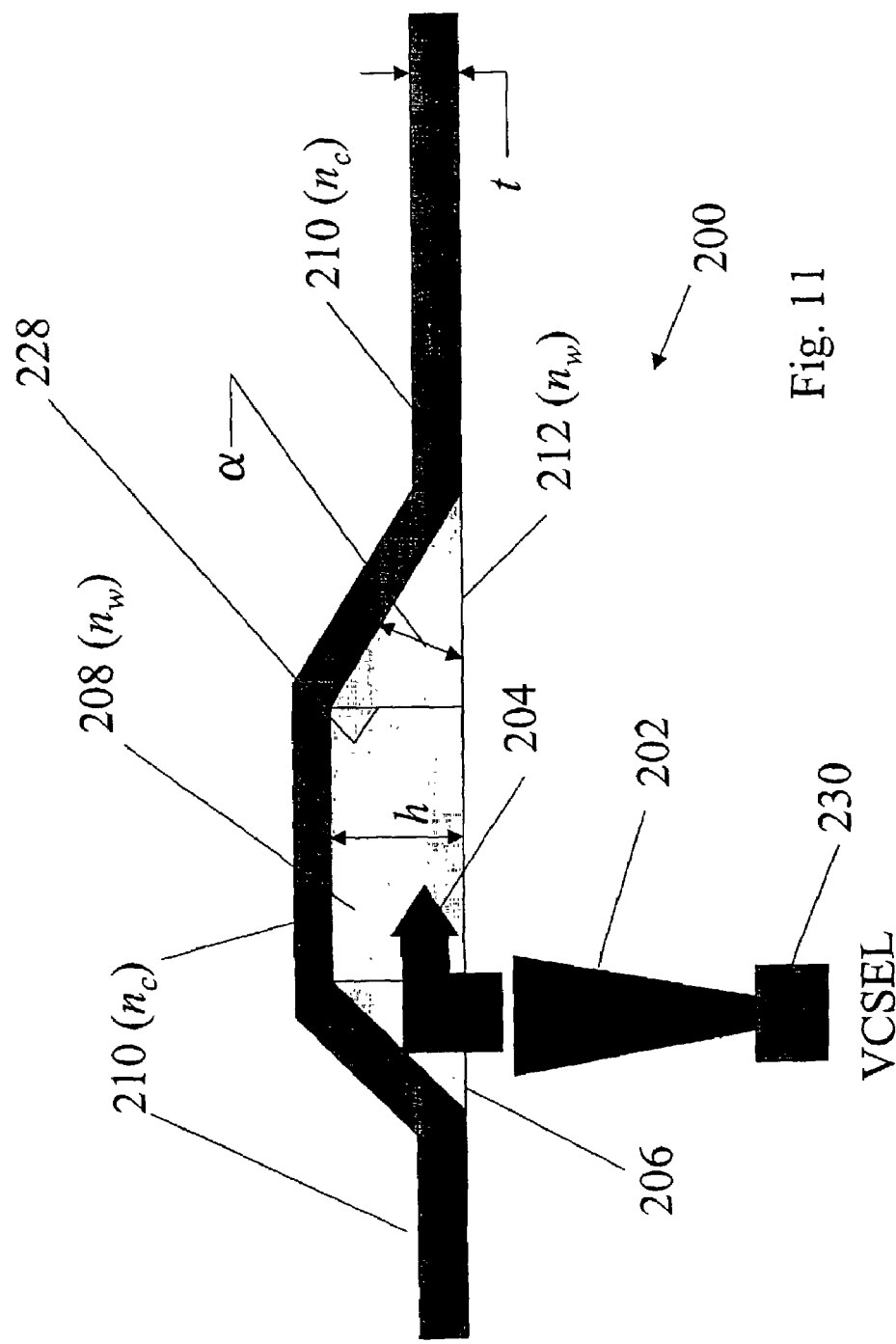
FIG. 11 shows an arrangement of a waveguide receptive of N-mode radiation from a radiation source wherein the waveguide includes a first section, a second section and a tapered section, the second section has a refractive index different than that of the first section and the second section encompasses the tapered section and the first section.

In a fifth embodiment, as seen in FIG. 11, the second waveguide section 210 encases or envelopes the optical beam redirection device 206, the first waveguide section 208 and the first tapered section 212 of FIG. 8.

Referring to FIGS. 12, 13 and 14, and FIGS. 33, 34 and 35, a sixth embodiment of the optical coupling system 200 is shown. In FIGS. 12, 13 and 14, the cladding 216, having a thickness of c and a refractive index of $n_w$, is receptive of the N-mode radiation 204 from the optical beam redirection device 206 along an axis 224. The second waveguide section 210, which is symmetric with respect to the axis 224, has a thickness of "t" (less than "c"), a refractive index of $n_c$ (greater than $n_w$) and a segment thereof 220 positioned within the cladding 216 over a length of b. In FIG. 12, the segment of the second waveguide 220 positioned within the cladding 216 is terminated with a square or rectangular end. In FIGS. 13 and 14, the segment of the second waveguide 220 positioned within the cladding 216 includes a wedge 222. The wedge 222 has a generally triangular cross section including a base with a thickness "t" joined with the second waveguide section 210 and an angled apex opposed to the base. The wedge 222 is receptive of the N-mode radiation 204 from the optical beam redirection device 206 along the axis 224 for coupling the N-mode radiation 204 from the optical beam redirection device 206 to the second waveguide section 210. In FIG. 13, the triangular cross section 220 is inclined with respect to the second waveguide section 210 at angle, θ, of between approximately 5–10 degrees. The triangular cross section in FIG. 14 is generally a right triangle positioned so that the hypotenuse thereof is first receptive of the N-mode radiation 204 from the tapered section 212, thus coupling the N-mode radiation from the first waveguide section 208 to the second waveguide section 210. As best understood from FIGS. 12, 13 and 14, in contrast to FIGS. 8, 9 and 10, the first waveguide section 208 acts as a cladding to the second waveguide section 210. The use of the first waveguide section 208, either as a core or a cladding, depends on how it is applied within the whole structure.

Figure 16:
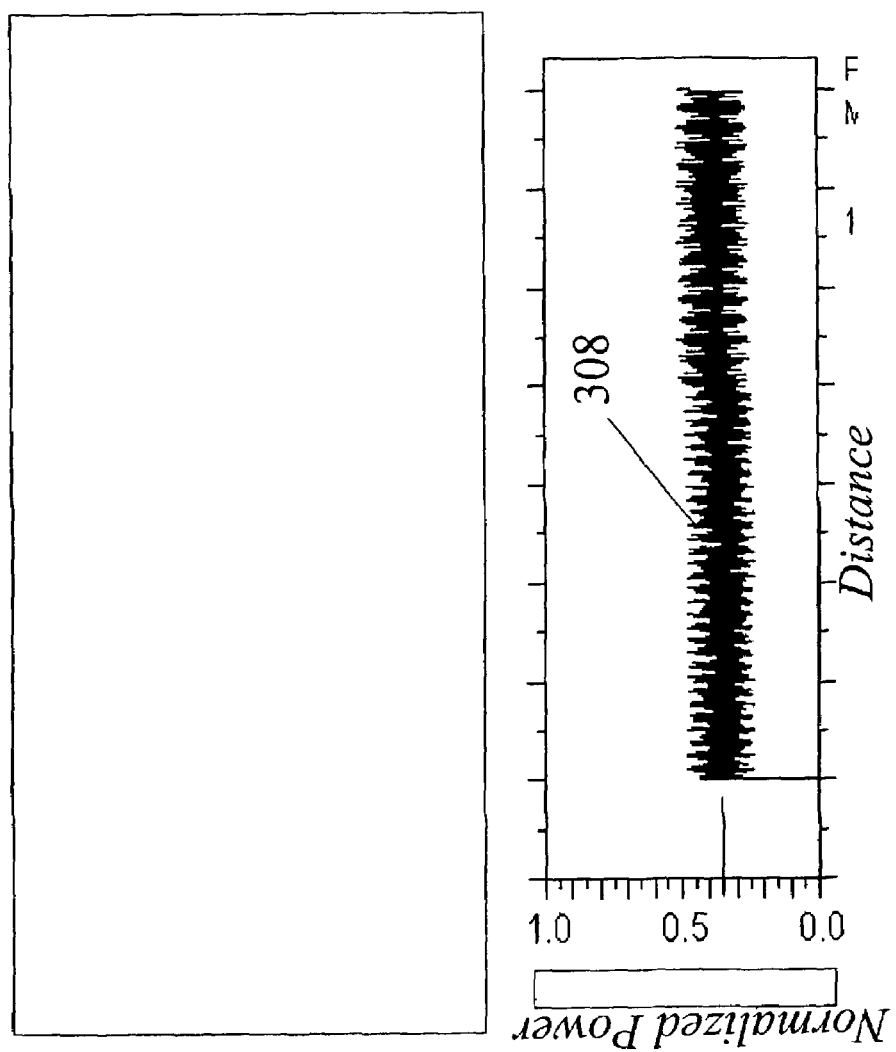
FIG. 16 is a graphical representation of the normalized power coupled into the waveguide of FIG. 15 as a function of distance therealong.

Referring to FIGS. 15, 17 and 19, a seventh embodiment is shown. In a fashion similar to that shown in FIG. 12, in FIGS. 15, 17 and 19, the cladding 216, having a thickness of c and a refractive index of $n_w$, is receptive of the N-mode radiation 204 from the optical beam redirection device 206 along an axis 224. The second waveguide section 210, which is symmetric with respect to the axis 224, has a thickness of "t" (less than "c"), a refractive index of $n_c$ (greater than $n_w$) and a segment thereof 220 positioned within the cladding 216 over a length of "b". In FIG. 15, the segment of the second waveguide 220 positioned within the cladding 216 is terminated with a square or rectangular end. FIG. 16 depicts a graphical representation at 308 of the normalized power coupled into the second waveguide section 210 of FIG. 15 as a function of distance along the cladding 216 and the second waveguide section 210.

Figure 18:
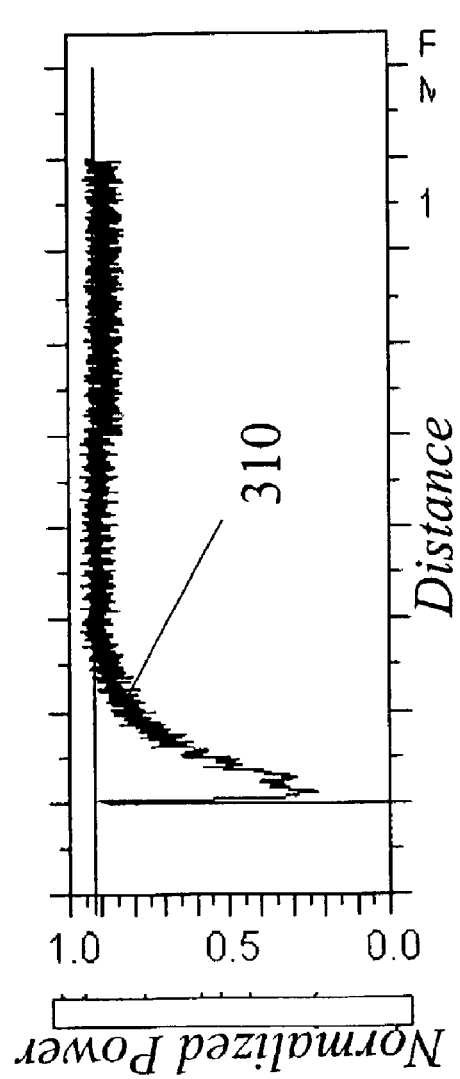
FIG. 18 is a graphical representation of the normalized power coupled into the waveguide of FIG. 17 as a function of distance therealong.

Also in a fashion similar to FIGS. 13 and 14, in FIGS. 17 and 19, the segment of the second waveguide 220 positioned within the cladding 216 includes a wedge 222. The wedge 222 has a generally triangular cross section including a base with a thickness "t" joined with the second waveguide section 210 and an angled apex opposed to the base. The wedge 222 is receptive of the N-mode radiation 204 from the optical beam redirection device 206 along the axis 224 for coupling the N-mode radiation 204 from the optical beam redirection device 206 to the second waveguide section 210. FIG. 18 depicts a graphical representation at 310 of the normalized power coupled into the second waveguide section 210 of FIG. 17 as a function of distance along the cladding 216 and the second waveguide section 210. FIG. 20 depicts a graphical representation at 312 of the normalized power coupled into the second waveguide section 210 of FIG. 19 as a function of distance along the cladding 216 and the second waveguide section 210.

However, it is seen in FIGS. 15, 17 and 19, that the cladding 216 is truncated over a segment thereof having a length "d" wherein the second waveguide section 210 is not enveloped by the cladding 216 over that segment.

Also as best understood from FIGS. 15, 17 and 19, in contrast to FIGS. 8, 9 and 10, the first waveguide section 208 acts as a cladding to the second waveguide section 210. The use of the first waveguide section 208, either as a core or a cladding, depends on how it is applied within the whole structure. Still further, as can be seen in FIGS. 18 and 20, the addition of the wedge 222 in FIGS. 17 and 19 respectively, provides a noticeable improvement in the coupling of energy from the cladding 216 into the second waveguide section 210 (about 0.9 normalized units for the arrangement in FIG. 17 and about 0.8 normalized units for the arrangement in FIG. 19), as compared to that seen in FIG. 16 for a second waveguide section 210 with a wedge 222 (about 0.35 normalized units). However, in comparing the coupling in FIGS. 20 and 22, it is seen that the thickness of the second waveguide section 210 has less of an impact on coupling than the addition of the wedge 222.

Referring to FIGS. 21, 23 and 25, a seventh embodiment is shown. In a fashion similar to that shown in FIG. 12, in FIGS. 21, 23 and 25, the cladding 216, having a thickness of "c" and a refractive index of $n_w$, is receptive of the N-mode radiation 204 from the optical beam redirection device 206 along an axis 224. The second waveguide section 210, which is symmetric with respect to the axis 224, has a thickness of t (less than "c"), a refractive index of $n_c$ (greater than $n_w$) and a segment thereof 220 positioned within the cladding 216 over a length of "b". In FIG. 21, the segment of the second waveguide 220 positioned within the cladding 216 is terminated with a square or rectangular end. FIG. 22 depicts a graphical representation at 314 of the normalized power coupled into the second waveguide section 210 of FIG. 21 as a function of distance along the cladding 216 and the second waveguide section 210.

Figure 24:
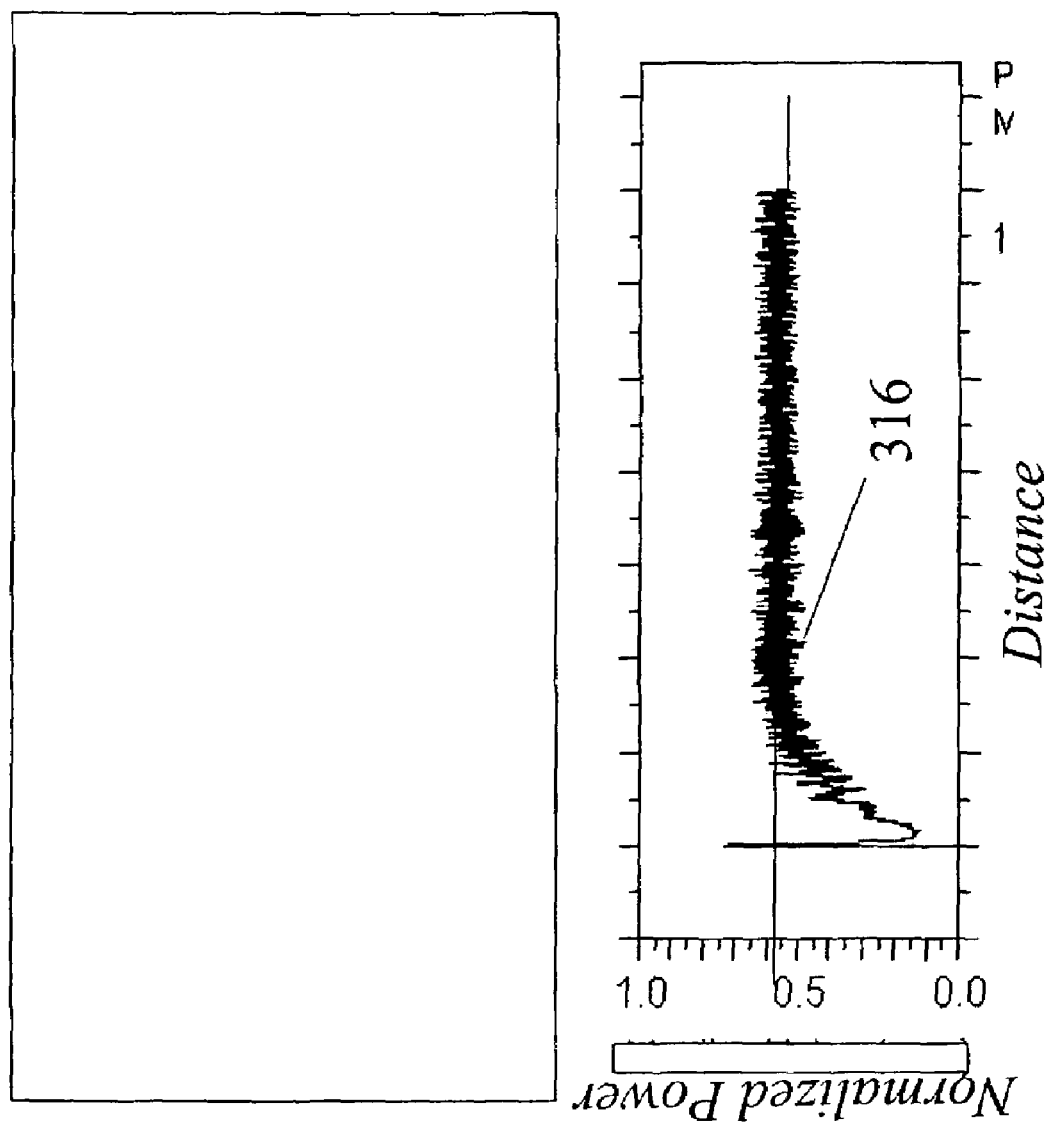
FIG. 24 is a graphical representation of the normalized power coupled into the waveguide of FIG. 23 as a function of distance therealong.
Figure 26:
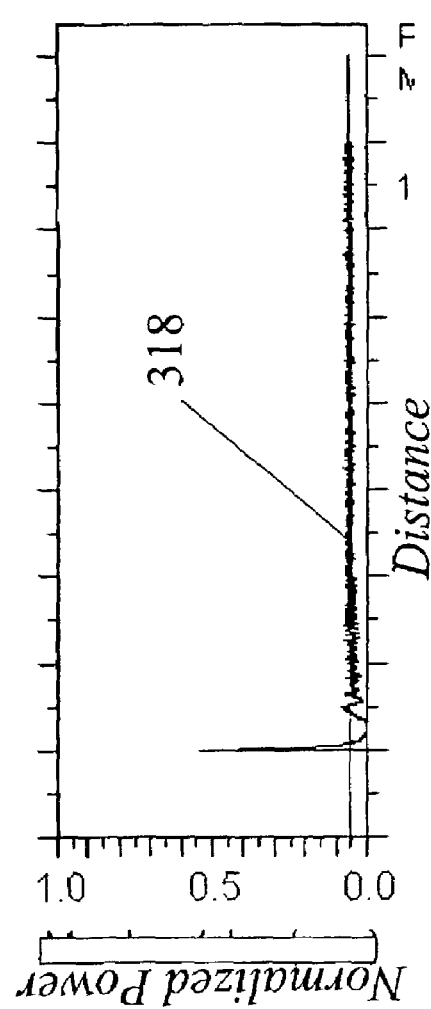
FIG. 26 is a graphical representation of the normalized power coupled into the waveguide of FIG. 25 as a function of distance therealong.

Also in a fashion similar to FIGS. 13 and 14, in FIGS. 23 and 25, the segment of the second waveguide 220 positioned within the cladding 216 includes a wedge 222. The wedge 222 has a generally triangular cross section including a base with a thickness "t" joined with the second waveguide section 210 and an angled apex opposed to the base. The wedge 222 is receptive of the N-mode radiation 204 from the optical beam redirection device 206 along the axis 224 for coupling the N-mode radiation 204 from the optical beam redirection device 206 to the second waveguide section 210. FIG. 24 depicts a graphical representation at 316 of the normalized power coupled into the second waveguide section 210 of FIG. 23 as a function of distance along the cladding 216 and the second waveguide section 210. FIG. 26 depicts a graphical representation at 318 of the normalized power coupled into the second waveguide section 210 of FIG. 25 as a function of distance along the cladding 216 and the second waveguide section 210.

Again, it is seen in FIGS. 21, 23 and 25, that the cladding 216 is truncated over a segment thereof having a length "d" wherein the second waveguide section 210 is not enveloped by the cladding 216 over that segment. However, it is also seen in FIGS. 21, 23 and 25 that the second waveguide section 210 is offset from the axis 224 by a distance "r".

As seen in FIGS. 22 and 23, the amount of energy coupled from the cladding 216 into the second waveguide section 210, for the same offset "r" in the arrangements of FIGS. 21 and 23 respectively, is approximately the same (about 0.6 normalized units) despite a thinner second waveguide section 210 in FIG. 23. Thus, the thickness of the second waveguide section 210 does not dictate the coupling efficiency. However, as seen in FIG. 25, for too large of an offset "ro", the coupling efficiency is dramatically reduced (to about 0.05 normalized units).

As shown in FIGS. 22, 24 and 26, a smaller offset "r" yields a better coupling. However, a certain amount of offset "r" may occur due to fabrication processing, etc. Therefore, innovative solutions are disclosed in FIG. 10 (using a special taper design for "drawing" the energy into a preferred waveguide layer) and in FIG. 33 (using a tapered cladding to "squeeze" the energy into a preferred waveguide layer).

As best understood from FIGS. 21, 23 and 25, in contrast to FIGS. 8, 9 and 10, the first waveguide section 208 acts as a cladding to the second waveguide section 210. The use of the first waveguide section 208, either as a core or a cladding, depends on how it is applied within the whole structure.

Figure 27:
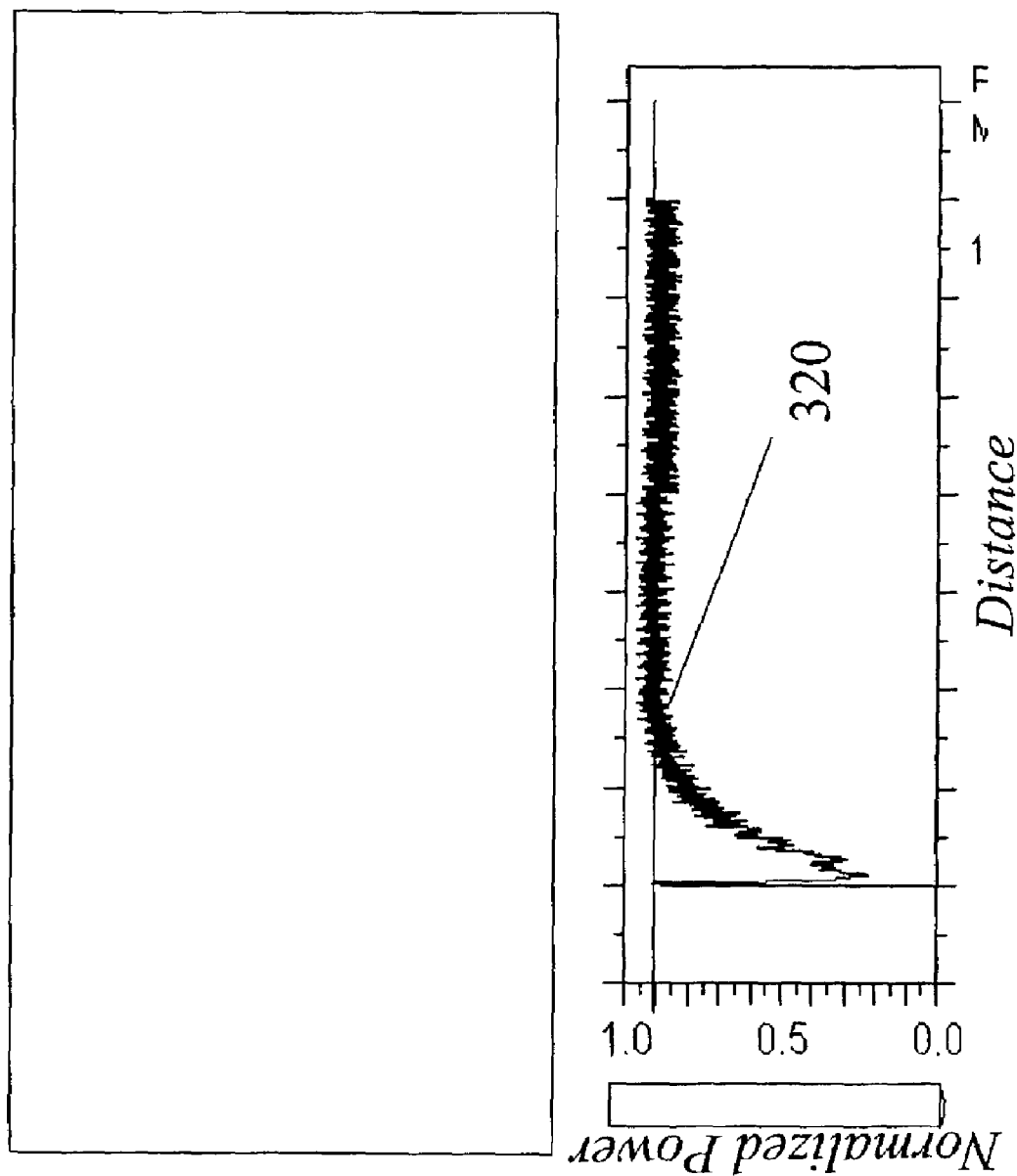
FIG. 27 is a graphical representation of the power coupled into the waveguide of FIG. 17 as a function of distance therealong.
Figure 28:
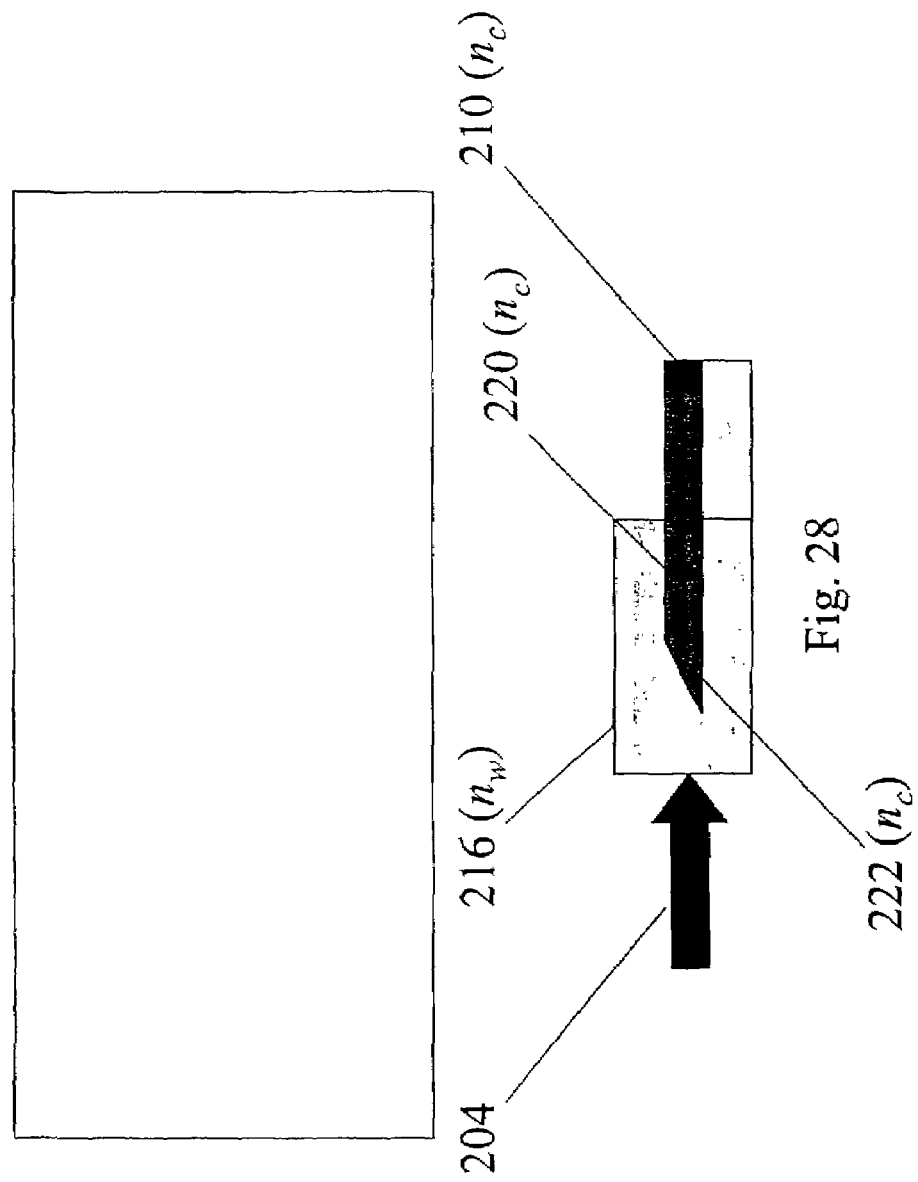
FIG. 28 shows an arrangement of a waveguide receptive of N-mode radiation from a radiation source wherein the waveguide includes a first section and a second section having a refractive index different than that of the first section and wherein the second section includes a segment thereof including an asymmetric wedge-like segmen positioned within the first section and the first section is partially truncated.
Figure 29:
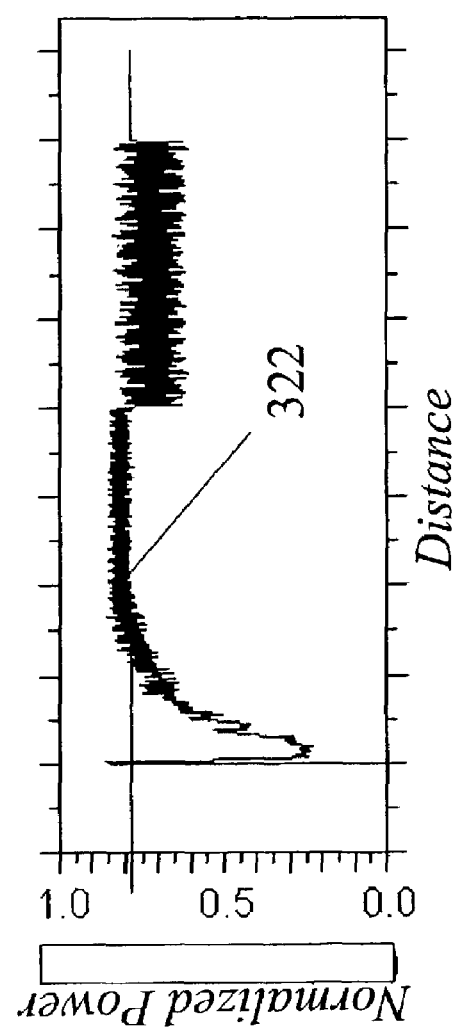
FIG. 29 is a graphical representation of the normalized power coupled into the waveguide of FIG. 28 as a function of distance therealong.

In the arrangement of FIG. 17 a symmetric wedge 222 is shown, and in FIG. 28 an asymmetric wedge 222 is shown. The difference in the coupling efficiency between the arrangements of FIGS. 17 and 28 is seen in comparing FIGS. 27 and 29 respectively. In FIG. 27 it is seen that the symmetric wedge 222, has a higher coupling efficiency (about 0.9 normalized units) than that of FIG. 29 (about 0.8 normalized units).

Figure 30:
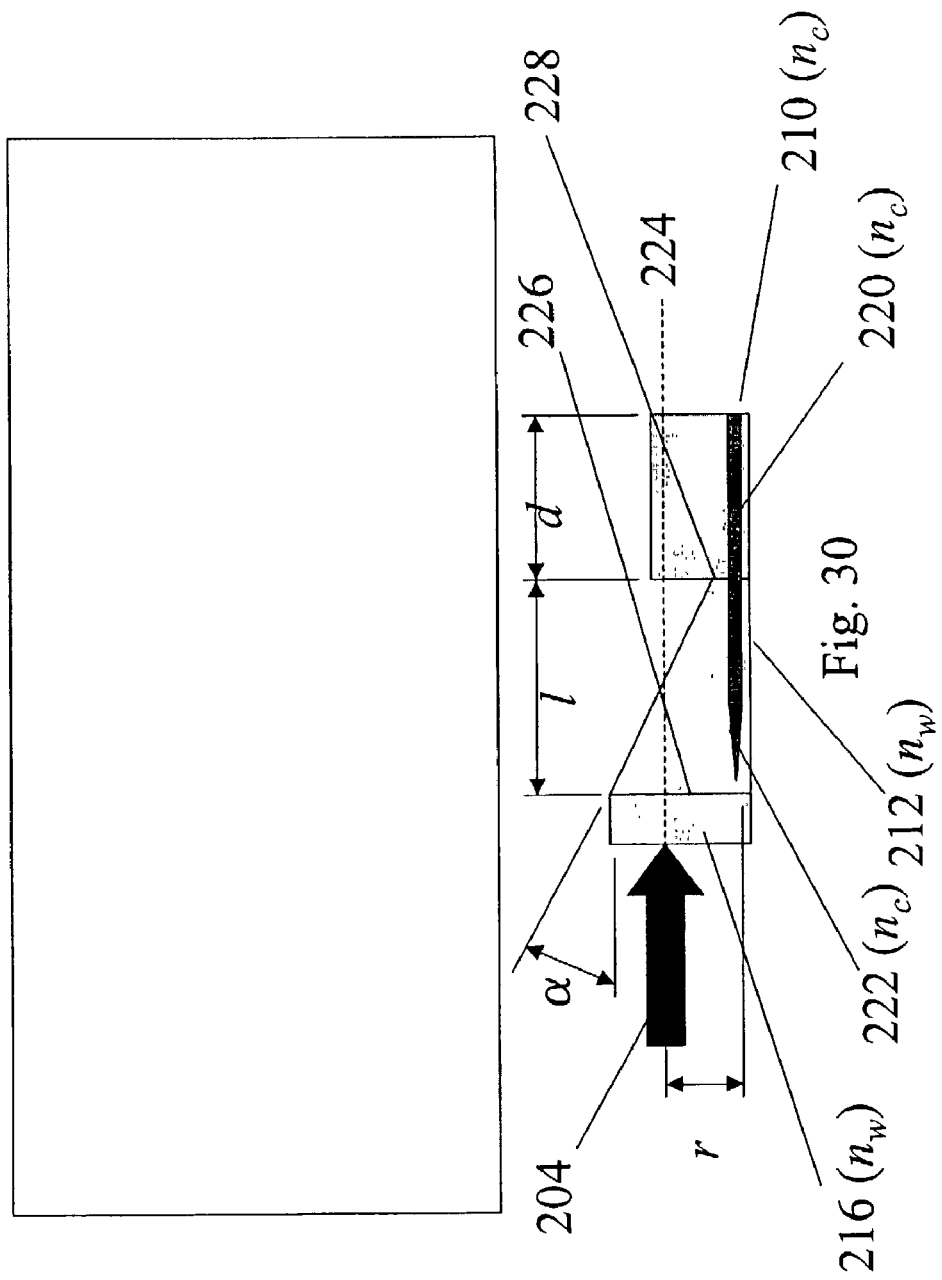
FIG. 30 shows an arrangement of a waveguide receptive of N-mode radiation along an axis from a radiation source wherein the waveguide includes a first section, a second section and a tapered section and wherein the second section has a refractive index different than that of the first section and the tapered section encompasses a segment of the second section.
Figure 31:
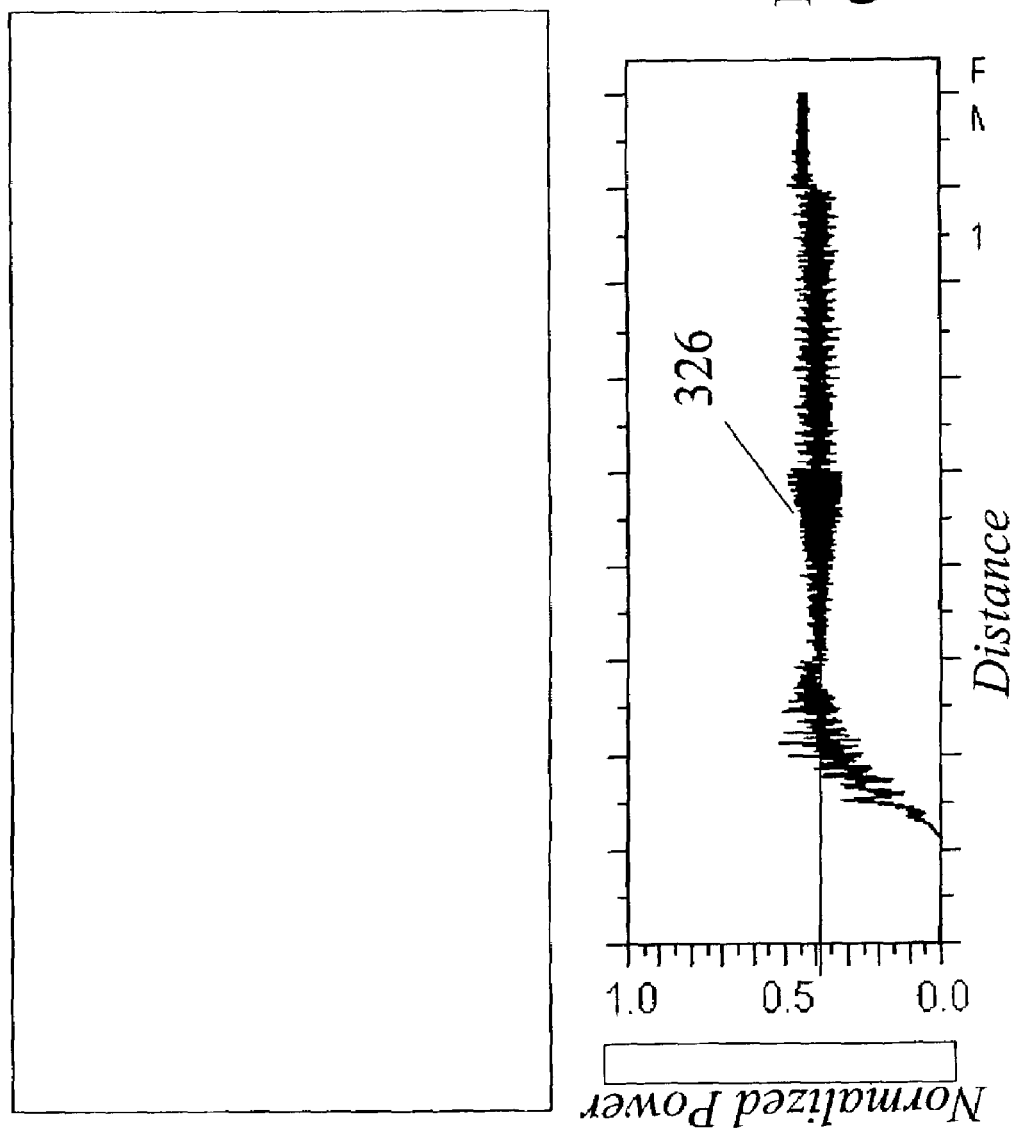
FIG. 31 is a graphical representation of the normalized power coupled into the waveguide of FIG. 30 as a function of distance therealong.
Figure 32:
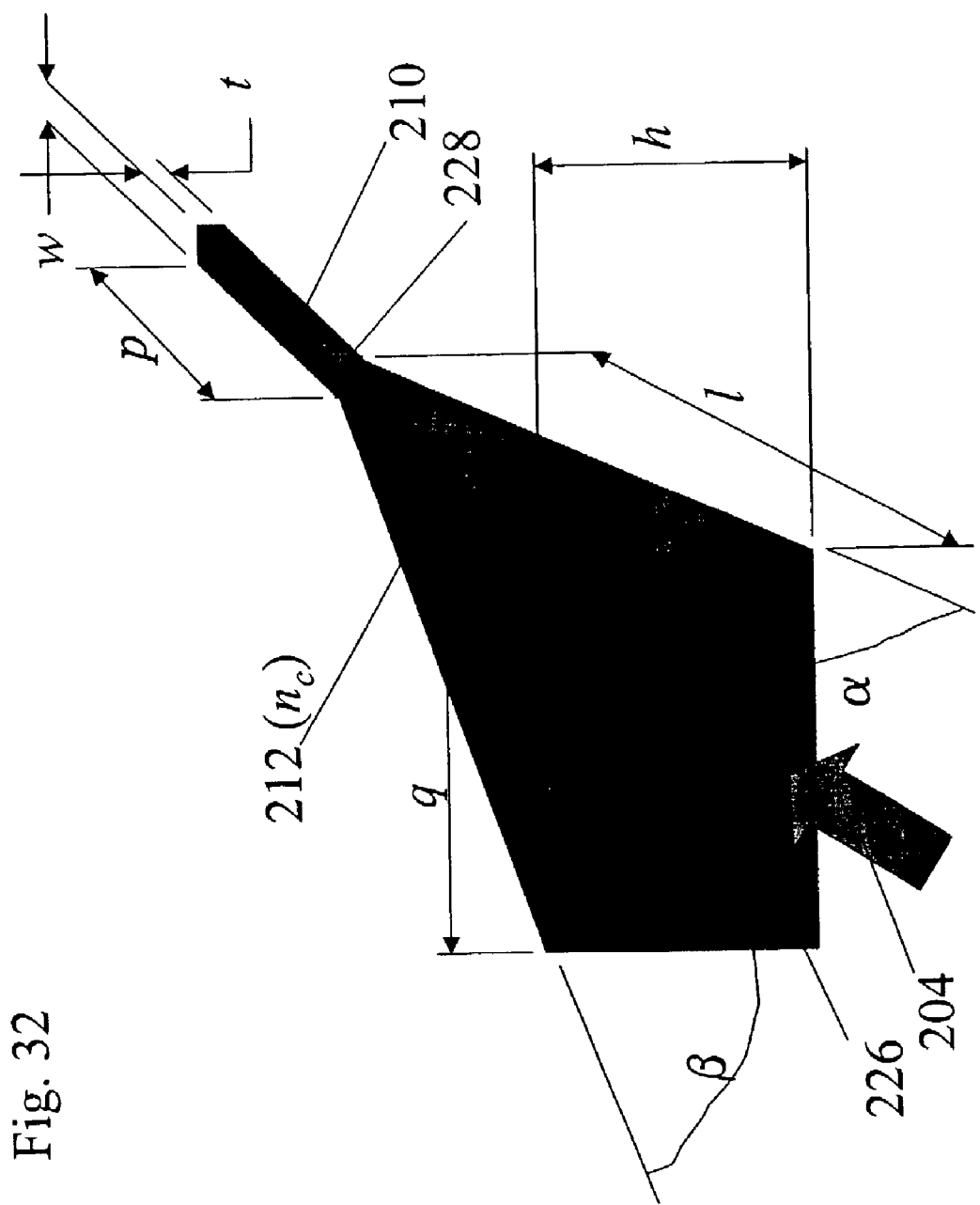
FIG. 32 is a three dimensional view of a waveguide device for coupling optical radiation between optical elements.

In the arrangement of FIG. 25, a symmetric wedge 222 and the second waveguide section 210 are off set by a distance "r" from the axis 224. As seen in FIG. 26 this arrangement yields a relatively poor coupling efficiency 318 of about 0.05 normalized units. Referring to FIG. 30 an eighth embodiment is shown. In FIG. 30, the cladding 216, again having a thickness of "c" and a refractive index of $n_w$, is receptive of the N-mode radiation 204 from the optical beam redirection device 206 along an axis 224. The tapered section 212 has a first aperture 226 with a thickness of h joined with the cladding 216 and a second aperture 228 opposed to and smaller than the first aperture 226. Again, as seen in FIG. 32, the tapered section 212 in FIG. 30 has a length, "l", of approximately 100–1000 um and also subtends a first angle, $\alpha$, of about 5–10 degrees and a second angle, $\beta$, perpendicular to the first angle, $\alpha$, of about 5–50 degrees. The tapered section 212 is receptive of the N-mode radiation at the first aperture 226 from the cladding 216. In FIG. 30, the second waveguide section 210 is offset from the axis 224 by a distance "r" and includes a segment 220 thereof positioned and encased within the tapered section 212. The segment 220 of the second waveguide section 210 positioned within the tapered section 212 includes a wedge 222. The wedge 222 has a generally triangular cross section including a base with a thickness "t" joined with the second waveguide section 210 and an angled apex opposed to the base. The wedge 222 is receptive of the N-mode radiation 204 from the tapered section 212. FIG. 31 depicts a graphical representation at 326 of the normalized power coupled into the second waveguide section 210 of FIG. 30 as a function of distance along the tapered section 212 and the second waveguide section 210. As can be seen in FIG. 31, the coupling efficiency for the arrangement shown in FIG. 30 is an improvement over that shown in FIG. 26 relating to the arrangement of FIG. 25.

FIGS. 33, 34 and 35 show various configurations of the wedge-like segment of the second section of the waveguide. In general, the taper and wedge are "gentle" or "slow." That is, the angles, a and b, of these tapers or wedges are small. Therefore, "h" and "q" are much larger than the waveguide thickness "t" and width "w". Thus, the angles a and b in FIG. 32 will be then determined accordingly. The length of the wedge-like segment 222 is "k" and the angles $\theta$ and $\gamma$ of FIGS. 33, 34 and 35 are also relatively small. Thus, the wedge-like segment 222 is accordingly elongated in nature. As best understood the tapered section 212 and wedge-like segments 222 are all of an elongated nature wherein the angles a, b, $\theta$ and $\gamma$ are relatively small or acute.

Any references to first, second, etc., or front or back, right or left, top or bottom, upper or lower, horizontal or vertical, or any other phrase indicating the relative position of one quantity or variable with respect to another are, unless noted otherwise, intended for the convenience of description of the invention, and do not limit the present invention or its components to any one positional or spatial orientation. All dimensions of the components in the attached Figures can vary with a potential design and the intended use of an embodiment without departing from the scope of the invention.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. An optical coupling system for coupling optical energy between optical devices, the system comprising:
   a waveguide receptive of N-mode radiation from a radiation source where N is an integer;
   the waveguide comprising:
      a first section receptive of the N-mode radiation from the optical beam redirection device and having a thickness of h and being asymmetric in shape;
      a second section having a thickness of t wherein t is less than h; and
      a tapered section having a first end thereof with a thickness of h joined with the first waveguide section and a second end thereof with a thickness of t joined with the second waveguide section for coupling the N-mode radiation from the first waveguide section to the second waveguide section.

2. The optical coupling system as set forth in claim 1 further comprising an optical beam redirection device receptive of the N-mode radiation from the radiation source for directing the N-mode radiation to the first waveguide section.

3. The optical coupling system as set forth in claim 2 wherein the optical beam redirection device comprises a prism.

4. The optical coupling system as set forth in claim 2 wherein the optical beam redirection device comprises a lens or a diffraction grating.

5. The optical coupling system as set forth in claim 1 wherein h is approximately 10–100 um and t is approximately 2–10 um.

6. The optical coupling system as set forth in claim 1 wherein the tapered section has a length of approximately 100–1000 um.

7. The optical coupling system as set forth in claim 1 further comprising a cladding having a refractive index of $n_w$ and encasing the waveguide having a refractive index of $n_c$, wherein $n_w$ is less than $n_c$.

8. The optical coupling system as set forth in claim 1 wherein the first waveguide section and the tapered section are defined by a refractive index, $n_w$, and the second waveguide section is defined by a refractive index, $n_c$, and wherein $n_c$ is greater than $n_w$.

9. The optical coupling system as set forth in claim 8 wherein the second waveguide section is a cladding encasing the optical beam redirection device, the first waveguide section and the first tapered section.

10. The optical coupling system as set forth in claim 8 wherein the second waveguide section further comprises a top-layer tapered section wherein the refractive index difference between the second waveguide section and the tapered section is extended from an upper surface of the second waveguide section to a point along the tapered section.

11. The optical coupling system as set forth in claim 8 wherein the second waveguide section includes a segment thereof positioned within the first tapered section.

12. The optical coupling system as set forth in claim 8 wherein the second waveguide section includes a segment thereof positioned within the first tapered section and the first waveguide section.

13. An optical coupling system for coupling optical energy between optical devices, the system comprising:
a waveguide receptive of N-mode radiation from a radiation source where N is an integer;
the waveguide comprising:
a first section receptive of the N-mode radiation from the optical beam redirection device and having a thickness of h;
a second section having a thickness of t wherein t is less than h; and
a tapered section having a first end thereof with a thickness of h joined with the first waveguide section and a second end thereof with a thickness of t joined with the second waveguide section for coupling the N-mode radiation from the first waveguide section to the second waveguide section
wherein the first end of the tapered section includes a first aperture and the second end of the tapered section includes a second aperture substantially parallel to the first aperture and wherein the first and second apertures are spaced apart from one another so that the tapered section subtends a first angle, $\alpha$, of about 5–10 degrees and a second angle, $\beta$, perpendicular to the first angle, $\alpha$, of about 5–10 degrees at the second waveguide section.

14. An optical coupling system for coupling optical energy between optical devices, the system comprising:
a waveguide receptive of N-mode radiation from a radiation source where N is an integer;
the waveguide comprising:
a first section receptive of the N-mode radiation from the optical beam redirection device and having a thickness of h;
a second section having a thickness of t wherein t is less than h; and
a tapered section having a first end thereof with a thickness of h joined with the first waveguide section and a second end thereof with a thickness of t joined with the second waveguide section for coupling the N-mode radiation from the first waveguide section to the second waveguide section;
wherein the first waveguide section and the tapered section are defined by a refractive index, $n_w$, and the second waveguide section is defined by a refractive index, $n_c$, and wherein $n_c$ is greater than $n_w$;
wherein the second waveguide section includes a segment thereof positioned within the first tapered section; and
wherein the segment of the second waveguide section positioned within the first tapered section is a wedge having a triangular in cross section including a base with a length t joined with the second waveguide section and an angled apex opposed to the base;
wherein the wedge is receptive of the N-mode radiation front the first tapered section for coupling the N-mode radiation from the first waveguide section to the second waveguide section.

15. The optical coupling system as set forth in claim 14 wherein the triangular cross section is inclined with respect to the second waveguide section.

16. The optical coupling system as set forth in claim 14 wherein the angled apex of the wedge includes an angle of about 5–10 degrees.

17. The optical coupling system as set forth in claim 14 wherein the wedge includes a length of about 100–1000 um.

18. An optical coupling system for coupling optical energy between optical devices, the system comprising:
a first waveguide having a thickness of c and a refractive index of $n_w$, and receptive of the N-mode radiation from a radiation source along an axis;
a second waveguide having a segment thereof positioned within the first waveguide and having a thickness of t, wherein t is less than c and a refractive index of $n_c$ wherein $n_c$ is greater than $n_w$ wherein the segment of the second waveguide positioned within the first waveguide includes a wedge having a triangular cross section including a base with a length t joined with the second waveguide section and an angled apex opposed to the base;
wherein the wedge is receptive of the N-mode radiation from the optical beam redirection device for coupling the N-mode radiation from the optical beam redirection device to the second waveguide section.

19. The optical coupling system as set forth in claim 18 further comprising an optical beam redirection device receptive of the N-mode radiation from the radiation source for directing the N-mode radiation to the first waveguide where N is an integer.

20. The optical coupling system as set forth in claim 19 wherein a segment of the first waveguide is truncated by a distance d.

21. The optical coupling system as set forth in claim 19 wherein the second waveguide is offset from the axis of the N-mode radiation by a distance r.

22. The optical coupling system as set forth in claim 18 wherein the wedge is inclined with respect to the second waveguide section.

23. The optical coupling system as set forth in claim 18 wherein the angled apex of the wedge includes an angle of about 5–10 degrees.

24. The optical coupling system as set forth in claim 18 wherein the wedge includes a length of about 100–1000 um.

25. An optical coupling system for coupling optical energy between optical devices, the system comprising:
an optical beam redirection device receptive of N-mode radiation from a radiation source where N is an integer;
a waveguide having a refractive index of $n_w$ and receptive of the N-mode radiation from the optical beam redirection device along an axis;
the waveguide comprising:
a first section receptive of the N-mode radiation from the optical beam redirection device;
a tapered section receptive of the N-mode radiation from the first waveguide section; and
a third section positioned within the tapered section, the third section having a refractive index of $n_c$ and receptive of the N-mode radiation from the tapered section;
wherein $n_c$ is greater than $n_w$.

26. The optical coupling system as set forth in claim 25 wherein the third waveguide section is offset from the axis of the N-mode radiation by a distance r.

27. An optical coupling system for coupling optical energy between optical devices, the system comprising:
an optical beam redirection device receptive of N-mode radiation from a radiation source where N is an integer;
a waveguide receptive of the N-mode radiation from the optical beam redirection device;
the waveguide comprising:
a first section receptive of the N-mode radiation from the optical beam redirection device and having a thickness of h and being asymmetric in shape;
a tapered section having a first end thereof with a thickness of h joined with the first waveguide section and a second end thereof with a thickness of t for coupling the N-mode radiation from the first waveguide section to a second waveguide.

28. The optical coupling system as set forth in claim 27 wherein the first end of the tapered section includes a first aperture and the second end of the tapered section includes a second aperture substantially parallel to the first aperture and wherein the first and second apertures are spaced apart from one another so that the tapered section subtends a first angle, α, of about 5–10 degrees and a second angle, β, perpendicular to the first angle, α, of about 5–10 degrees at the second waveguide.

29. An optical coupling system for coupling optical energy between optical devices, the system comprising:
 a radiation source;
 an optical beam redirection device positioned a prescribed distance from the radiation source and receptive of N-mode radiation therefrom where N is an integer;
 a waveguide receptive of the N-mode radiation from the optical beam redirection device;
 the waveguide comprising:
  a first section receptive of the N-mode radiation from the optical beam redirection device and having a thickness of h and being asymmetric in shape;
  a second section having a thickness of t wherein t is less than h; and
  a tapered section having a first end thereof with a thickness of h joined with the first waveguide section and a second end thereof with a thickness of t joined with the second waveguide section for coupling the N-mode radiation from the first waveguide section to the second waveguide section.

30. The optical coupling system as set forth in claim 29 wherein the first end of the tapered section includes a first aperture and the second end of the tapered section includes a second aperture substantially parallel to the first aperture and wherein the first and second apertures are spaced apart from one another so that the tapered section subtends a first angle, α, of about 5–10 degrees and a second angle, β, perpendicular to the first angle, α, of about 5–10 degrees at the second waveguide section.

* * * * *

UNITED STATES PATENT AND TRADEMARK OFFICE
CERTIFICATE OF CORRECTION

PATENT NO. : 7,046,879 B2  Page 1 of 1
APPLICATION NO. : 10/065881
DATED : May 16, 2006
INVENTOR(S) : Christopher Kapusta et al.

It is certified that error appears in the above-identified patent and that said Letters Patent is hereby corrected as shown below:

Column 6,
Line 9, after "the", insert --35,--.

Column 11,
Line 53, before "the" (first occurrence), delete "front" and insert therefor --from--.

Signed and Sealed this

Seventeenth Day of October, 2006

JON W. DUDAS
*Director of the United States Patent and Trademark Office*